US007129943B2

(12) United States Patent
Zhang et al.

(10) Patent No.: US 7,129,943 B2
(45) Date of Patent: Oct. 31, 2006

(54) SYSTEM AND METHOD FOR FEATURE-BASED LIGHT FIELD MORPHING AND TEXTURE TRANSFER

(75) Inventors: Zhunping Zhang, Beijing (CN); Lifeng Wang, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 10/295,570

(22) Filed: Nov. 15, 2002

(65) Prior Publication Data

US 2004/0222989 A1 Nov. 11, 2004

(51) Int. Cl.
G06T 15/00 (2006.01)
(52) U.S. Cl. ................. 345/426; 345/629; 345/419
(58) Field of Classification Search ................. 345/419, 345/420, 619, 629, 426
See application file for complete search history.

(56) References Cited

U.S. PATENT DOCUMENTS

| | | | | |
|---|---|---|---|---|
| 6,333,749 | B1 * | 12/2001 | Reinhardt et al. | 345/629 |
| 6,421,049 | B1 * | 7/2002 | Reinhardt et al. | 345/420 |
| 6,697,062 | B1 * | 2/2004 | Cabral et al. | 345/419 |
| 6,750,860 | B1 * | 6/2004 | Shum et al. | 345/419 |

OTHER PUBLICATIONS

Zhang et al., Feature-Based Light Field Morphing, Micerosoft Research Asia, ACM, Jul. 2002, pp. 457-464.*
Ashikhmin, M. 2001. Synthesizing natural textures. *ACM Symposium on Interactive 3D Graphics*, 217-226.

Bar-Joseph, Z., El-Yaniv, R., Lischinski, D., and Werman, M. 2001. Texture mixing and texture movie syntheseis using statistical learning. *IEEE Transactions on Visualization and Computer Graphics 7*, 2, 120-135.
Beier, T., and Neely, S. 1992. Feature-based image metamorphosis. *Computer Graphics (Proceedings of SIGGRAPH 92) 26*, 2 (Jul.), 35-42.
Brooks, S., and Dodgson, N. 2002. Self-similarity based texture editing. *ACM Transactions on Graphics 21*, 3 (Jul.), 653-656. (Proceedings of ACM SIGGRAPH 2002).
Dischler, J., Maritaud, K., Levy, B., and Ghazanfarpour, D. 2002. Texture particles. *Computer Graphics Forum 21*, 3, 401-410.
Efros, A. A., and Freeman, W. T. 2001. Image quilting for texture synthesis and transfer. In *Proceedings of ACM SIGGRAPH 2001*, Computer Graphics Proceedings, Annual Conferences Series, 341-345.

(Continued)

*Primary Examiner*—Phu K. Ngyuen
(74) *Attorney, Agent, or Firm*—Lyon & Harr, LLP; Mark A. Watson

(57) ABSTRACT

A "light field morpher," as described herein, provides a computationally efficient system and method for image-based three-dimensional (3D) morphing and texture transfer of 3D objects by morphing "light fields" or "lumigraphs," associated with source and target 3D objects. The light field morpher is applicable to morphing of objects having either or both Lambertian, or non-Lambertian surfaces, including surfaces having complex properties such as fur, subsurface scattering, and hypertextures, without the need for object modeling, or otherwise recovering detailed object geometry. Light field morphing begins by first specifying corresponding 2D and 3D feature elements, such as, "feature lines," "feature polygons," and "background edges," in the input light fields representing the source and target light fields. Once the feature elements have been specified, "ray-space warping" of both light fields then warps those light fields to produce feature alignment. These warped light fields are then blended to produce a light field morph.

34 Claims, 9 Drawing Sheets
(4 of 9 Drawing Sheet(s) Filed in Color)

OTHER PUBLICATIONS

Efros, A. A., and Leung, T. K. 1999. Texture synthesis by non-parametric sampling. In *Proceedings of International Conference on Computer Vision*.

Gomes, J., Costa, B., Darsa, L., and Velho, L. 1998. *Warping and Morphing of Graphics Objects*. Morgan Kaufmann.

Gorla, G., Interrante, V., and Sapiro, G. 2001. Growing fitted textures. *SIGGRAPH 2001 Sketches and Applications* (Aug.), 191.

Guo, C., Zhu, S. C., and Wu, Y.-N. 2001. Visual learning by integrating descriptive and generative methods. In *Proceedings of International Conference on Computer Vision (ICCV)*, 370-377.

Harrison, P. 2001. A non-hierarchical procedure for synthesis of complex textures. In *Proceedings of Winter School of Computer Graphics*.

Hertzmann, A., Jacobs, C. E., Oliver, N., Curless, B., and Salesin, D. H. 2001. Image analogies. *Proceedings of SIGGRAPH 2001* (Aug.), 327-340.

Leung, T. K., and Malik, J. 1996. Detecting, localizing and grouping repeated scene elements from an image. In *Proceedings of European Conference on Computer Vision*.

Liang, L., Liu, C., Xu, Y., Guo, B., and Shum, H.-Y. 2001. Real-time texture synthesis using patch-based sampling. *ACM Transactions on Graphics 20*, 3 (Jul.).

Liu, Z., Liu, C., Shum, H.-Y., and Yu, Y. 2002. Pattern-based texture metamorphosis. In *Proceedings of Pacific Graphics*, 184-191.

Malik, J., Belongie, S., Shi, J., and Leung, T. 1999. Textons, contours and regions: cue integration in image segmentation. In *Proceedings of International Conference on Computer Vision (ICCV)*, 918-925.

Mallat, S., Papanicolaou, G., and Zhang, Z. 1998. Adaptive covariance estimation of locally stationary processes. *Annals of Statistics 26*, 1,1-47.

Praun, E., Finkelstein, A., and Hoppe, H. 2000. Lapped textures. *Proceedings of SIGGRAPH 2000* (Jul.), 465-470.

Soler, C., Cani, M.-P., and Angelidis, A. 2002. Hierarchical pattern mapping. *ACM Transactions on Graphics 21*, 3 (Jul.), 673-680. (Proceedings of ACM SIGGRAPH 2002).

Suzuki, S., and Abe, K. 1985. Topological structural analysis of digital binary images by border following. *Computer Vision, Graphics, and Image Processing 30*, 1, 32-46.

Tong, X., Zhang, J., Liu, L., Wang, X., Guo, B., and Shum, H.-Y. 2002. Sythesis of bidirectional texture functions on arbitrary surfaces. *ACM Transactions on Graphics 21*, 3 (Jul.), 665-672. (Proceedings of ACM SIGGRAPH 2002).

Tonietto, L., and Walter, M. 2002. Towards local control for image-based texture synthesis. In *Proceedings of SIBGRAPI 2002 - XV Brazilian Symposium on Computer Graphics and Image Processing*.

Turk, G. 1991. Generating textures for arbitrary surfaces using reaction-diffusion. *Computer Graphics (Proceedings of SIGGRAPH 91) 25*, 4 (Jul.) 289-298.

Turk, G. 2001. Texture synthesis on surfaces. *Proceedings of SIGGRAPH 2001* (Aug.), 347-354.

Walter, M., Fournier, A., and Menevaux, D. 2001. Integrating shape and pattern in mammaliam models. *Proceedings of SIGGRAPH 2001* (Aug.), 317-326.

Wei, L.-Y., and Levoy, M. 2000. Fast texture synthesis using tree-structured vector quantization. *Proceedings of SIGGRAPH 2000* (Jul.), 479-488.

Wei, L.-Y and Levoy, M. 2001. Texture synthesis over arbitrary manifold surfaces. *Proceedings of SIGGRAPH 2001* (Aug.), 355-360.

Wei, L.,-Y. 2001. *Texture Synthesis by fixed Neighborhood Searching*. Ph.D. Dissertation, Stanford University.

Witkin, A., and Kass, M. 1991. Reaction-diffusion textures. *Computer Graphics (Proceedings of SIGGRAPH 91) 25*, 4 (Jul.), 299-308.

Ying, L., Hertzmann, A., Biermann, H., and Zorin, D. 2001. Texture and shape synthesis on surfaces. *Proceedings of 12th Eurographics Workshop on Rendering* (Jun.), 301-312.

Zalesny, A., Ferrari, V., Caenen, G., Der Maur, D. A., and Gool, L. V. 2002. Composite texture descriptions. In *Proceedings of ECCV*, vol. 3, 341-346.

Zhu, S., Wu, Y., and Mumford, D. 1998. Filters random fields and maximum entropy (frame). *International Journal of Computer Vision 27*, 2 (Mar.), 107-126.

Sunil Arya, David Mount, Nathan Netanyahu,. Ruth Silverman, and Angela Wu. An optimal algorithm for approximate nearest neighbor searching. *Journal of the ACM*, 45:891-923, 1998.

Oana G. Cula and Kristin J. Dana. Compact representation of bidirectional texture functions. In *Proceedings of IEEE Conference on Computer Vision and Pattern Recognition*, Dec. 2001.

Brian Curless and Marc Levoy. A volumetric method for building complex models from range images. In *Proceedings of SIGGRAPH 96*, Computer Graphics Procedings, Annual Conference Series, pp. 303-312, New Orleans, Louisiana, Aug. 1996.

Kristin J. Dana and Shree Nayar. 3d textured surface modeling. In *Proceedings of IEEE Workshop on the Integration of Appearence and Geometric Methods in Object Recognition*, pp. 46-56, Jun. 1999.

Kristin J. Dana, Bram van Ginneken, Shree K. Nayar, and Jan J. Koenderink. Reflectance and texture of real-world surfaces. *ACM Trasactions on Graphics*, 18(1):1-34, Jan. 1999.

Paul E. Debevec, Yizhou Yu, and George D. Borshukov. Efficient view dependent image-based rendering with projective texture-mapping. *Eurographics Rendering Workshop 1998*, pp. 105-116, Jun. 1998.

Pei hsiu Suen and Glenn Healey. The analysis and recognition of real-world textures in 3d. *IEEE Transactions on Patten Analysis and Machine Intelligence*, 22(5):491-503, May 2000.

Jan J. Koenderink and Andrea J. Van Doorn. Illuminance texture due to surface mesostructure. *Journal of the Optical Society of America*, 13(3):452-463, 1996.

Thomas Leung and Jitendra Malik. Representing and recognizing the visual appearence of materials using 3d textons. *International Journal of Computer Vision*, 43(1):29-44, Jun. 2001.

Xinguo Liu, Yizhou Yu, and Heung-Yeung Shum. Synthesizing bidirectional texture functions for real-world surfaces. *Proceedings of SIGGRAPH 2001*, pp. 97-106, Aug. 2001.

Jerome Maillot, Hussein Yahia, and Anne Verroust. Interactive texture mapping. *Proceedings of SIGGRAPH 93*, pp. 27-34, Aug 1993.

Tom Malzbender, Dan Gelb, and Hans Wolters. Polynomial texture maps. *Proceedings of SIGGRAPH 2001*, pp. 519-528, Aug. 2001.

Greg Turk. Re-tiling polygonal surfaces. *Computer Graphics (Proceedings of SIGGRAPH 92)*, 26(2):55-64, Jul. 1992.

Daniel N. Wood, Daniel I. Azuma, Ken Aldinger, Brian Curless, Tom Duchamp, David H. Salesin, and Werner Stuetzle. Surface light fields for 3d photography. In *Proceedings of SIGGRAPH 2000*, Computer Graphics Proceedings, Annual Conference Series, pp. 287-296, Jul. 2000.

Lexing Ying, Aaron Hertzmann, Henning Biermann, and Denis Zorin. Texture and shape synthesis on surfaces. *Proceedings of 12th Eurographics Workshop on Rendering*, pp. 301-312, Jun. 2001.

Bryan P. Bergeron. Morphing as a means of generating variability in visual medical teaching materials. *Computers in Biology and Medicine*, 24:11-18, Jan. 1994.

Chris Buehler, Michael Bosse, Leonard McMillan, Steven J. Gortler, and Michael F. Cohen. Unstructured lumigraph rendering. *Proceedings of SIGGRAPH 2001*, pp. 425-432, Aug. 2001.

Shenchang Eric Chen and Lance Williams. View interpolation for image synthesis. *Proceedings of SIGGRAPH 93*, pp. 279-288, Aug. 1993.

Daniel Cohen-Or, Amira Solomovici, and David Levin. Three-dimensional distance field metamorphosis. *ACM Transactions on Graphics*, 17(2):116-141, Apr. 1998. ISSN 07300301.

Douglas DeCarlo and Jean Gallier. Topological evolution of surfaces. *Graphics Interface '96*, pp. 194-203, May 1996.

Julie Dorsey and Pat Hanrahan. Modeling and rendering of metallic patinas. *Proceedings of SIGGRAPH 96*, pp. 387-396, Aug. 1996.

Steven J. Gortler, Radek Grzeszczuk, Richard Szeliski, and Michael F. Cohen. The lumigraph. *Proceedings of SIGGRAPH 96*, pp. 43-54, Aug. 1996.

Arthur Gregory, Andrei State, Ming C. Lin, Dinesh Manocha, and Mark A. Livingston. Interactive surface decomposition for polyhedral morphing. *The Visual Computer*, 15(9):453-470, 1999.

John F. Hughes. Scheduled fourier volume morphing. *Computer graphics (Proceedings of SIGGRAPH 92)*, 26(2):43-46, Jul. 1992.

James R. Kent, Wayne E. Carlson, and Richard E. Parent. Shape transformation for polyhedral objects. *Computer Graphics (Proceedings of SIGGRAPH 92)*, 26(2):47-54, Jul. 1992.

Francis Lazarus and Anne Verroust. Three-dimensional metamorphosis:a survey. *The Visual Computer*, 14(89):373-389, 1998.

Aaron Lee, David Dobkin, Wim Sweldens, and Peter Schroder. Multiresolution mesh morphing. *Proceedings of SIGGRAPH 99*, pp. 343-350, Aug. 1999.

Apostolos Lerios, Chase D. Garfinkle, and Marc Levoy. Feature-based volume metamorphosis. *Proceedings of SIGGRAPH 95*, pp. 449-456, Aug. 1995.

Marc Levoy. Expanding the horizons of image-based modeling and rendering. In *SIGGRAPH 97 Panel: Image-based Rendering: Really New or Deja Vu*, 1997.

Marc Levoy and Pat Hanrahan. Light field rendering. *Proceedings of SIGGRAPH 96*, pp. 31-42, Aug. 1996.

Wojciech Matusik, Chris Buehler, Ramesh Raskar, Steven J. Gortler, and Leonard McMillan. Image-based visual hulls. In *Proceedings of ACM SIGGRAPH 2000*, Computer Graphics Proceedings, Annual Conference Series, pp. 369-374, Jul. 2000.

Steven M. Seitz and Charles R. Dyer. View morphing: Synthesizing 3d metamorphose using image transforms. *Proceedings of SIGGRAPH 96*, pp. 21-30, Aug. 1996.

Steven M. Seitz and Kiriakos N. Kutulakos. Plenoptic image editing. In *ICCV98*, pp. 17-24, 1998.

Jonathan Shade, Steven J. Gortler, Li wei He, and Richard Szeliski. Layered depth images. In *Proceedings of SIGGRAPH 98*, Computer Graphics Proceedings, Annual Conference Series, pp. 231-242, Orlando, Florida, Jul. 1998.

Heung Yeung Shum and Li Wei He. Rendering with concentric mosaics. *Proceedings of SIGGRAPH 99*, pp. 299-306, Aug. 1999. ISBN 0201485605. Held in Los Angeles, California.

Laszlo Szirmay-Kalos and Werner Purgathofer. Global raybundle tracing with hardware acceleration. *Eurographics Rendering Workshop 1998*, pp. 247-258, Jun. 1998.

George Wolberg. Image morphing: a survey. *The Visual Computer*, 14(89):360-372, 1998.

* cited by examiner

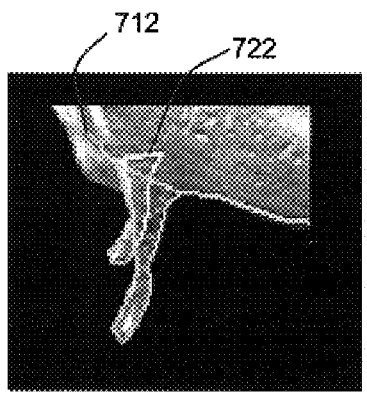
FIG. 7A
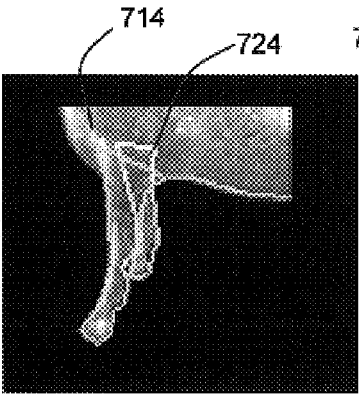
FIG. 7B
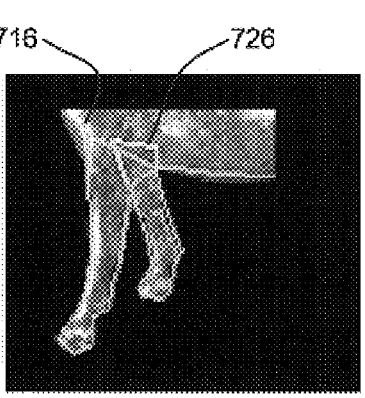
FIG. 7C
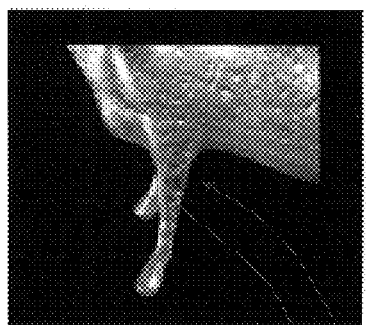
FIG. 7D
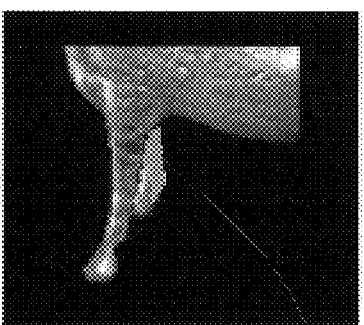
FIG. 7E
FIG. 7F

SYSTEM AND METHOD FOR FEATURE-BASED LIGHT FIELD MORPHING AND TEXTURE TRANSFER

BACKGROUND

1. Technical Field

The invention is related to morphing three-dimensional objects represented by light fields, and in particular, to a system and method for image-based three-dimensional morphing and texture transfer based on a correspondence between rays of source and target light fields.

2. Related Art

Metamorphosis, or morphing, is a popular technique for creating visual effects. In general, image morphing is the construction of an image sequence depicting a gradual transition between two images. Thus, when used effectively, morphing can produce a compelling illusion that an object is smoothly transforming from one object into another. Morphing two-dimensional (2D) images simply morphs the images themselves. However, when morphing images represented by three-dimensional (3D) models, intermediate 3D models; i.e., "morphs" are typically generated directly from the given models rather than simply morphing the images themselves. These morphs are then rendered to produce a morphed image sequence depicting a transformation from a source 3D model to a target 3D model.

With conventional 3D morphing schemes, creating the morphs is independent of the viewing and lighting parameters. Consequently, a single morph sequence can be created then rendered with various camera angles and lighting conditions during rendering. This differs from the 2D morphing approach where a new morph must be recomputed every time it is desired to alter the viewpoint or the illumination of the morphed view.

A variety of conventional schemes for morphing 3D objects have been proposed. Many such schemes are designed for geometry-based objects, i.e., objects whose geometry and surface properties are known, either explicitly as with conventional boundary-based techniques, or implicitly as with conventional volume-based techniques. In either case, such techniques typically rely on a three-dimensional mesh-type model of the objects being morphed. Unfortunately, where the geometry is unknown or difficult to model, such conventional 3D morphing schemes fail to create realistic morphs.

Volume-based 3D morphing schemes typically based on the concept of "volume morphing." Volume morphing schemes typically use a source and a target volume for creating morphs. Volume data used by such schemes is typically acquired by a number of techniques, including scanning, voxelizing a geometric model, interactive modeling, or procedurally defining hypertexture volumes as functions over 3D space. However, such methods either require extensive user input or interaction, or are very computationally expensive, or both.

Another scheme approaches 3D morphing using a technique termed "plenoptic editing." This scheme first recovers a 3D voxel model from the image data and then applies traditional 3D warping to the recovered model. Visibility issues can be resolved with the recovered geometry, but there are problems, including a Lambertian surface assumption needed for voxel carving, and fundamental difficulties associated with recovering detailed surface geometry from images. Further, Lambertian surface patches are idealized and assumed to have a constant luminance value. Consequently, the use of Lambertian surfaces fails to consider specular components to the reflected spectrum that exists on real, or non-Lambertian, surfaces. Such real, or non-Lambertian, surfaces typically exhibit specular characteristics that are not adequately modeled by this plenoptic editing scheme.

Therefore, what is needed is a system and method for morphing 3D objects without the need to explicitly consider object geometry. Further, such a system should both minimize user interaction and be computationally efficient. Finally, such a system and method should be capable of effectively morphing objects that include non-Lambertian and other specular surfaces.

SUMMARY

Light field morphing, as described herein, provides a general framework for image-based three-dimensional (3D) morphing and texture transfer. In general, a "light field morpher," as described herein, provides a computationally efficient system and method for morphing of 3D objects. Note that this morphing also includes the capability to transfer textures from one 3D object to another. The light field morpher accomplishes the morphing and texture transfer of 3D objects based on the morphing of "light fields," or "lumigraphs," associated with source and target 3D objects having either or both Lambertian, or non-Lambertian surfaces, without the need for object modeling, or otherwise recovering detailed object geometry. Consequently, one clear advantage of the light field morpher over conventional morphing schemes is the ability to easily work with objects that are difficult to model with traditional techniques. For example, because the light field morpher is capable of handling both Lambertian and non-Lambertian surfaces, light field morphing is applicable to objects having complex surface properties such as fur, subsurface scattering, and hypertextures.

In general, light field morphing begins by first specifying 2D and 3D feature elements in a number of input light fields representing one or more views of both a source and target light field. Note that overall morph quality tends to increase as more light field views are used. The aforementioned feature elements include "feature lines," "feature polygons," and "background edges." In one embodiment, each light field view is simultaneously displayed side-by-side in a display window to assist the user in specifying the feature elements. Once the feature elements have been specified, both light fields are warped to produce feature alignment. Finally, the warped light fields are blended to produce a light field morph.

The aforementioned feature lines are generated by first specifying "feature points" to define the feature lines. These feature points are simply 3D points on the object surface. The user specifies a feature point by doing manual correspondence in one or more views of each of the two light fields representing the source and target objects, respectively. In other words, after the user selects a point in the first light field, the user selects a corresponding point in the second light field. In one embodiment, this selection is accomplished by manual user selection of both corresponding points. The aforementioned "feature lines" are then simply polylines connecting two or more specified feature points.

In a related embodiment, the user is automatically assisted in the specification of corresponding feature points by an automatic epipolar geometry-based recommendation system. Specifically, after the user specifies a feature point in a first light field view, an epipolar line is automatically displayed in a second light field view. The corresponding feature point in the second light field view is then simply selected from along the length of this epipolar line. Consequently, the use of the epipolar-geometry assisted point selection serves to reduce the time needed for manual selection of corresponding points, while increasing the accuracy of point correspondence.

The aforementioned "feature polygons" are specified by the selection of a set of three or more feature points, in order, around the circumference of a polygon in one of the light field views. For example, in a tested embodiment of the light field morpher, a counter-clockwise specification of feature points around the circumference of a polygon was used to define that feature polygon. It should be noted that because each of the feature points in one light field view have corresponding feature points in the other light field view, manually specifying the feature points of a polygon in one light field view serves to automatically specify the feature points of a corresponding feature polygon in the other light field view.

Consequently, corresponding feature polygons represent corresponding areas of each model. For example, given two models of faces that are to be used for morphing by the light field morpher, a feature polygon may represent an element of each face, such as, for example, a nose on each face. Note that feature polygons are only used in areas of the light fields where visibility changes are caused by object shape changes. Thus, the specification of feature polygons may be rather sparse as there is no need to form an actual or even approximate 3D reconstruction of either 3D model.

As noted above, the light fields represent 3D models. Consequently, the feature polygons are typically non-planar. Unfortunately, feature polygons that are not sufficiently flat may cause self-occlusion problems when morphed. Therefore, in one embodiment, such feature polygons are automatically broken into smaller feature polygons, with each smaller non-planar polygon being sufficiently flat to avoid the issue of self occlusion.

In addition to the 3D feature elements described above, e.g., feature lines and feature polygons, 2D feature elements are also used. As noted above, the feature polygons are rather sparse and do not form a 3D reconstruction. As a result, a number of pixels in each light field are typically not covered by any feature polygons. These pixels are referred to herein "background pixels." These background pixels represent pixels of each light field having no visibility changes as a result of the light field morphing. Consequently, for these background pixels, the light field morphing is basically a 2D image morphing rather than a 3D morphing. To control the behavior of the background pixels, areas of background pixels in each light field are delimited by 2D feature elements called "background edges." These background edges are simply specified in a few key views of each light field, then interpolated to all other morphed views.

Once the aforementioned feature elements have been specified for one or more views of each light field, they are used to warp each of the light fields for the purpose of aligning the feature elements of the light fields.

In general, light field warping is accomplished by first computing feature elements and background edges for each warped light field by interpolating from the feature elements specified for the two input light fields, e.g., the source and target light fields. This interpolation is performed for feature points, feature lines, feature polygons, and background edges. While any desired interpolation method may be used, in a tested embodiment, simple linear interpolation was found to produce good results.

Next, a global visibility map that describes the visibility of the feature polygons for each light field is computed. In one embodiment, the global visibility maps are computed by simply rendering the feature polygons of each light field using conventional OpenGL techniques. As noted above, the feature polygons are non-planar. Consequently, the feature polygons can not be rendered using conventional OpenGL in the same manner as planar polygons. However, as is known to those skilled in the art, non-planar polygons having no self-occlusion can be rendered in two passes using an OpenGL stencil buffer. As noted above, any feature polygons that are not sufficiently flat are automatically broken into smaller feature polygons, with each smaller polygon being sufficiently flat to avoid the issue of self occlusion, thereby allowing those polygons to be rendered using the two pass OpenGL stencil buffer technique noted above.

In another embodiment, the user is limited to specifying triangular polygons. By nature, a triangle, having only three feature points is planar. Consequently, such polygons can be rendered in a single pass using conventional OpenGL rendering techniques. However, while useful, one downside to this embodiment is that the user will generally be required to specify a much larger number of feature polygons for each light field.

In either case, once computed, these global visibility maps decompose each light field into a set of ray bundles with each bundle representing a particular feature polygon, and a set of background rays representing areas of background pixels. In other words, the ray bundle of a particular feature polygon simply consists of all rays associated with that polygon. The ray bundles of the global visibility maps are then used in a "ray-space warping" process for warping each light field to align the feature polygons specified for each light field, while the background pixels are processed using 2D image warping techniques. This ray-space warping process results in two warped light fields, with each of these warped light fields corresponding to one of the original input light fields.

Note that for a given view of an object represented by a warped light field, "holes" are created by object shape changes when a hidden surface patch in the source light field becomes visible in the target light field. Such holes may be arbitrarily large. However, the holes are automatically filled during ray-space warping by approximating any occluded rays using a "nearest visible ray" for each feature polygon of the associated global visibility map. Further, this ray-space warping produces accurate results under a Lambertian surface assumption, while for non-Lambertian or specular surfaces, ray-space warping minimizes rendering errors by using the nearest visible rays based on the light field rays associated with each feature polygon of the global visibility map to assign pixel colors. In general, identification of the "nearest visible ray" is accomplished by searching each view plane of the model represented by the corresponding light field to identify a visible nearest neighbor. It should be noted that this search will never fail because each feature polygon will always be fully visible in at least one view plane.

Once the warped light fields have been computed, they are blended to produce a morphed light field of the object which represents the essential features of both the source and target objects. In one embodiment, a simple interpolation between each of the warped light fields is used to blend the warped light fields to create a composite light field representing the morph. In further embodiments, any of a number of conventional blending, feathering, and deghosting techniques is used in combining the two warped light fields to improve the image quality of the composite light field representing the morph. This morph can then be displayed using conventional light field rendering techniques to render the blended light field representing the morph.

Finally, in another embodiment, the transfer of 3D textures from one 3D object or model to another is accomplished as a straightforward application of light field morphing. In particular, in implementing such plenoptic texture transfer, after establishing ray correspondence between the source and target light fields as described above, the colors of source light field rays are simply assigned to the corresponding target light field rays. The result is a computationally efficient and realistic texture transfer from the source model to the target model.

In addition to the just described benefits, other advantages of the light field morpher will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee. The specific features, aspects, and advantages of the light field morpher will become better understood with regard to the following description, appended claims, and accompanying drawings where:

FIGS. 7A through 7F illustrate a set of warped light fields showing interpolation of feature polygons and filling of holes resulting from at least partially occluded feature polygons.

DETAILED DESCRIPTION OF THE PREFERRED EMBODIMENTS

In the following description of the preferred embodiments of the light field morpher, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
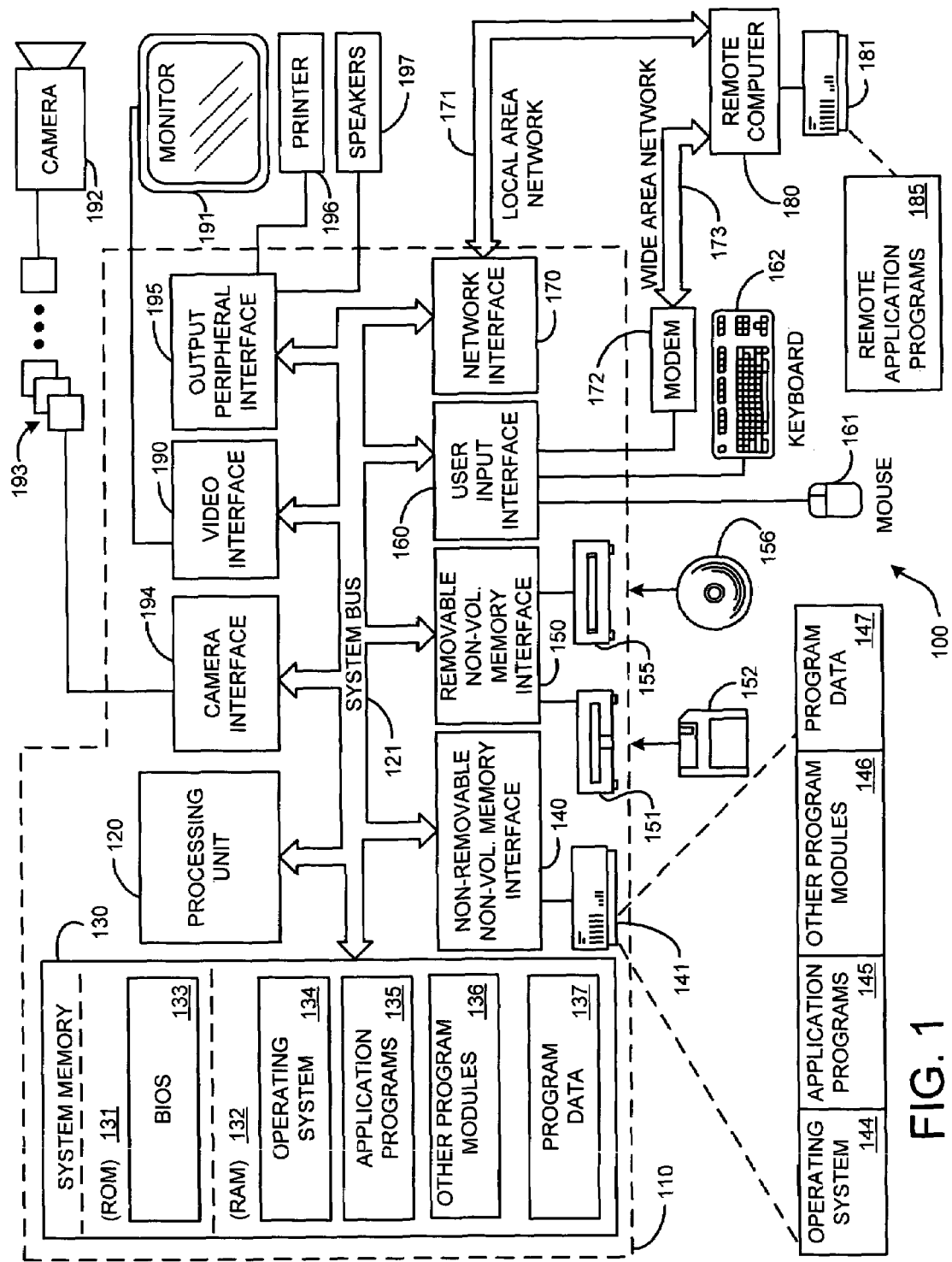
FIG. 1 is a general system diagram depicting a general-purpose computing device constituting an exemplary system for 3D feature-based light field morphing and texture transfer.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for feature-based light filed morphing and texture transfer.

2.0 Introduction:

Morphing, regardless of how it is accomplished, is essentially a correspondence problem. For example, conventional image morphing is based on two-dimensional (2D) pixel correspondence. Conventional mesh morphing is based on 3D vertex correspondence. And finally, in contrast to both 2D image morphing and conventional mesh-based morphing of 3D objects or models, light field morphing, as described herein, is based on four-dimensional (4D) ray correspondence. Further, as described in greater detail below, this ray-based light field morphing introduces a system and method of "ray-space warping" for handling visibility changes due to object shape changes.

Light field morphing, as described herein, provides a general framework for image-based three-dimensional (3D) morphing and texture transfer. A "light field morpher," as described herein, provides a computationally efficient system and method for morphing of 3D objects by morphing "light fields," or "lumigraphs," associated with source and target 3D objects. The light field morpher accomplishes 3D morphing of objects having either or both Lambertian, or non-Lambertian surfaces, including complex surface properties such as fur, subsurface scattering, and hypertextures, without the need for object modeling, or otherwise recovering detailed object geometry.

2.1 System Overview:

In general, light field morphing begins by first specifying 2D and 3D feature elements in one or more views of input light fields representing both a source and target light field. These feature elements include "feature lines," "feature polygons," and "background edges." In one embodiment, each light field view is simultaneously displayed side-by-side in a user interface display window to assist the user in specifying the corresponding feature elements. Once the feature elements have been specified, both light fields are warped to produce feature alignment. Finally, the warped light fields are blended to produce a light field morph.

The aforementioned feature lines are generated by first specifying "feature points" to define the feature lines. These feature points are simply 3D points on the object surface. The user specifies a feature point by doing manual correspondence in corresponding views of the two light fields representing the source and target objects, respectively. In other words, after the user selects a point in the first light field, the user then selects a corresponding point in the second light field. In one embodiment, this selection is accomplished by manual user selection of both corresponding points. The aforementioned "feature lines" are then simply lines connecting two or more specified feature points to form a polyline.

In a related embodiment, the user is automatically assisted in the specification of corresponding feature points by an automatic epipolar geometry-based recommendation system. Specifically, after the user specifies a feature point in a first light field view, an epipolar line is automatically displayed in a second light field view. The corresponding feature point in the second light field view is then simply selected from along the length of this epipolar line. Consequently, the use of the epipolar-geometry assisted point selection serves to reduce the time needed for manual selection of corresponding points, while increasing the accuracy of point correspondence.

The aforementioned "feature polygons" are 3D (non-planar) polygons approximating surface patches of 3D objects. These feature polygons are specified by the selection of a set of three or more feature points, in order, around the circumference of a polygon in one of the light field views. For example, in a tested embodiment of the light field morpher, a counter-clockwise specification of feature points around the circumference of a polygon was used to define that feature polygon.

It should be noted that because each of the feature points in one light field view have corresponding feature points in the other light field view, manually specifying the feature points of a polygon in one light field view serves to automatically specify the feature points of a corresponding feature polygon in the other light field view. As a result, corresponding feature polygons represent corresponding areas of each model. For example, given two models of faces that are to be used for morphing by the light field morpher, a feature polygon may represent an element of each face, such as, for example, a nose on each face. Note that feature polygons are only used in areas of the light fields where visibility changes are caused by object shape changes. Consequently, the specification of feature polygons may be rather sparse as there is no need to form an actual or even approximate 3D reconstruction of either 3D model.

As noted above, the light fields represent 3D models or objects. Consequently, the feature polygons are typically non-planar. Unfortunately, feature polygons that are not sufficiently flat may cause self-occlusion problems when morphed. Therefore, in one embodiment, such feature polygons are automatically broken into smaller feature polygons, with each smaller non-planar polygon being sufficiently flat to avoid the issue of self occlusion.

In addition to the 3D feature elements described above, e.g., feature lines and feature polygons, 2D feature elements are also used. As noted above, the feature polygons are rather sparse and do not form a 3D reconstruction. As a result, a number of pixels in each light field view are typically not covered by any feature polygons. These pixels are referred to herein "background pixels." These background pixels represent pixels of each light field having no visibility changes as a result of the light field morphing. Consequently, for these background pixels, the light field morphing is basically a 2D image morphing rather than a 3D morphing. To control the behavior of the background pixels, areas of background pixels in each light field are delimited by 2D feature elements called "background edges." These background edges areas are simply specified in a few key views of each light field, then interpolated to all other morphed views.

Once the aforementioned feature elements have been specified, they are used to warp each of the light fields for the purpose of aligning the feature elements of the light fields. In general, light field warping is accomplished by first computing feature elements and background edges for each warped light field by interpolating from the feature elements specified for the various views of the two input light fields, e.g., the source and target light fields. This interpolation is performed for feature points, feature lines, feature polygons, and background edges. While any desired interpolation method may be used, in a tested embodiment, simple linear interpolation was found to produce good results.

Next, a global visibility map that describes the visibility of the feature polygons for each light field is computed. In general, these global visibility maps associate each ray of a light field L with a feature polygon of L. The global visibility map of L is computed from the user-specified feature polygons of L. The global visibility map partitions L into ray bundles such that each feature polygon P is associated with a ray bundle R(P).

In one embodiment, the global visibility maps are computed by simply rendering the feature polygons of each light field using conventional OpenGL techniques. As noted above, the feature polygons are non-planar. Consequently, the feature polygons can not be rendered using conventional OpenGL in the same manner as planar polygons. However, as is known to those skilled in the art, non-planar polygons having no self-occlusion can be rendered in two passes using an OpenGL stencil buffer. As noted above, any feature polygons that are not sufficiently flat are automatically broken into smaller feature polygons, with each smaller polygon being sufficiently flat to avoid the issue of self occlusion, thereby allowing those polygons to be rendered using the two pass OpenGL stencil buffer technique noted above.

In another embodiment, the user is limited to specifying triangular polygons. By nature, a triangle, having only three feature points is planar. Consequently, such polygons can be rendered in a single pass using conventional OpenGL rendering techniques. However, while useful, one downside to this embodiment is that the user will generally be required to specify a much larger number of feature polygons for each light field.

In either case, once computed, these global visibility maps decompose each light field into a set of ray bundles, with each bundle representing a particular feature polygon, and a set of background rays representing areas of background pixels. In other words, the ray bundle of a particular feature polygon simply consists of all rays associated with that polygon. The ray bundles of the global visibility maps are then used in a "ray-space warping" process for warping each light field to align the feature polygons specified for each light field, while the background pixels are processed using 2D image warping techniques. In particular, light field warping is performed by warping one ray bundle at a time using "ray-space warping," with the ray correspondence of a ray bundle R(P) determined by control primitives associated with P. This ray-space warping process results in two warped light fields, $\hat{L}_0$ and $\hat{L}_1$ with each of these warped light fields corresponding to the original input light fields, $L_0$ and $L_1$, respectively.

Note that for a given view of an object represented by a warped light field, "holes" are created by object shape changes when a hidden surface patch in the source light field becomes visible in the target light field. Such holes may be arbitrarily large. However, the holes are automatically filled during ray-space warping by approximating any occluded rays using a "nearest visible ray" for each feature polygon of the associated global visibility map. Further, this ray-space warping produces accurate results under a Lambertian surface assumption, while for non-Lambertian or specular surfaces, ray-space warping minimizes rendering errors by using the nearest visible rays based on the light field rays associated with each feature polygon of the global visibility map to assign pixel colors. In general, identification of the "nearest visible ray" is accomplished by searching each view plane of the model represented by the corresponding light field to identify a visible nearest neighbor. It should be noted that this search will never fail because each feature polygon will always be fully visible in at least one view plane.

Once the warped light fields have been computed, they are blended to produce a morphed light field of the object which represents the essential features of both the source and target objects. In one embodiment, a simple interpolation between each of the warped light fields is used to blend the warped light fields to create a composite light field representing the morph. In further embodiments, any of a number of conventional blending, feathering, and deghosting techniques is used in combining the two warped light fields to improve the image quality of the composite light field representing the morph. This morph can then be displayed using conventional light field rendering techniques to render the blended light field representing the morph.

Finally, in another embodiment, the transfer of 3D textures from one 3D object or model to another is accomplished as a straightforward application of light field morphing. In particular, in implementing such plenoptic texture transfer, after establishing ray correspondence between the source and target light fields as described above, the colors of source light field rays are simply assigned to the corresponding target light field rays. The result is a computationally efficient and realistic texture transfer from the source model to the target model.

Figure 2:
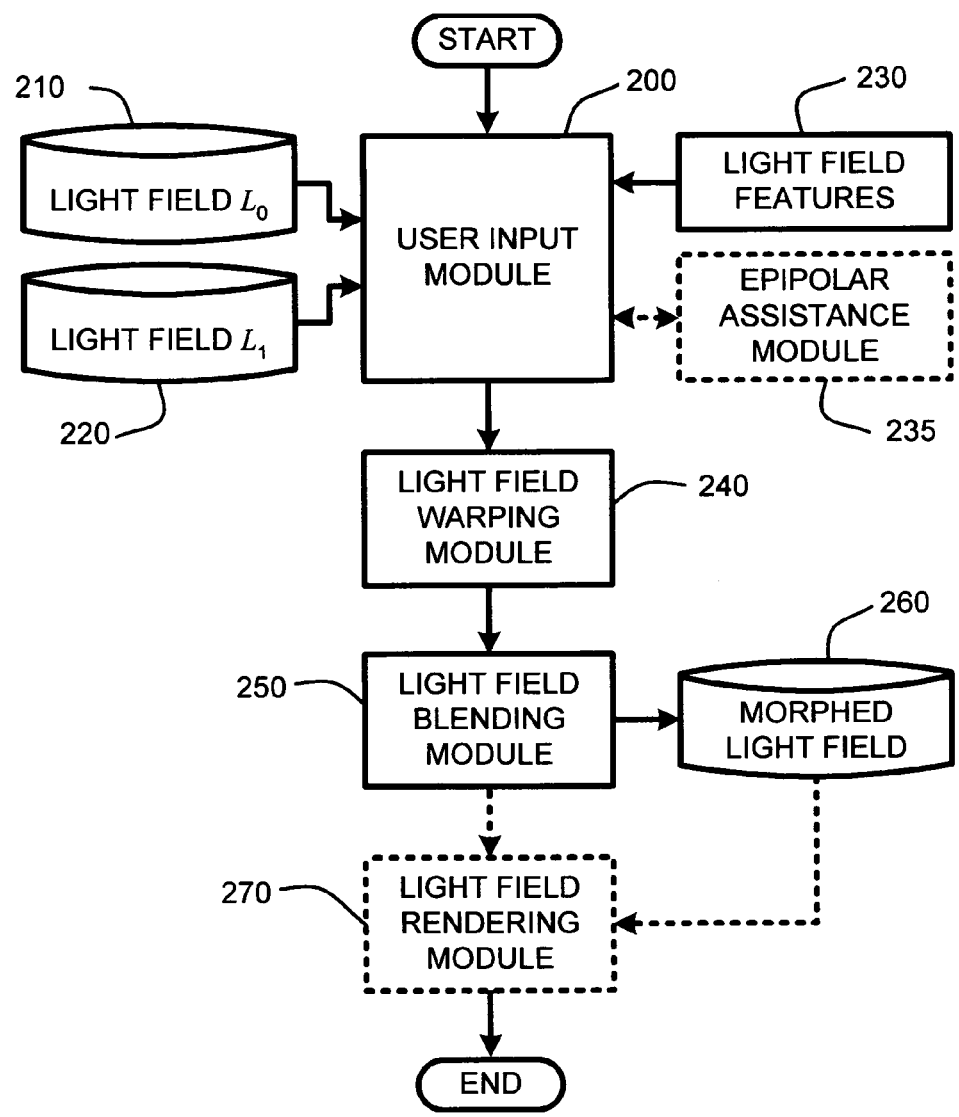
FIG. 2 illustrates an exemplary architectural diagram showing exemplary program modules for 3D feature-based light field morphing and texture transfer.

2.2 System Architecture:

The general system diagram of FIG. 2 illustrates the processes generally described above. In particular, the system diagram of FIG. 2 illustrates interrelationships between program modules for implementing a "light field morpher" for providing interactive image-based 3D morphing and texture transfer of 3D objects by morphing "light fields" or "lumigraphs," associated with source and target 3D models or objects. It should be noted that the boxes and interconnections between boxes that are represented by broken or dashed lines in FIG. 2 represent alternate embodiments of the light field morpher, and that any or all of these alternate embodiments, as described below, may be used in combination with other alternate embodiments that are described throughout this document.

In general, as illustrated by FIG. 2, a system and method for image-based 3D morphing and texture transfer of 3D objects begins by using a user interface module 200 to input a source light field $L_0$ 210, and a target light field $L_1$ 220. Once these light fields, 210 and 220, have been input, the user interface module displays the light fields in an interactive user interface window for allowing a user to specify feature elements 230 for each light field. In general, as described in further detail in Section 3.2, these feature elements 230 include 3D feature lines and feature polygons defined by feature points, and background edges.

The interactive user interface displayed by the user input module 200 displays the source light field $L_0$ 210 and the target light field $L_1$ 220 in a side-by-side interactive display. Feature elements are specified via the user interface module 200 by first specifying a feature point in either the source light field $L_0$ 210 or the target light field $L_1$ 220, then specifying a corresponding feature point in the other light field. In one embodiment, as discussed in detail in Section 3.2.1, an epipolar assistance module 235 assists the user in specifying the corresponding feature point by drawing an epipolar line on the light field for which a corresponding feature point is to be specified. The user then specifies the corresponding feature point by selecting a point along the length of the epipolar line. One or more feature points and corresponding feature points are then specified in this manner so as to allow the construction of feature lines, feature polygons, and background edges, as described below in Section 3.2.

Once all of the feature elements 230 have been specified for one or more views of both the source light field $L_0$ 210 and the target light field $L_1$ 220 a light field warping module 240 warps the light fields to produce feature alignment as discussed below in Sections 3.3 and 3.4. The warped light fields are then blended by a light field blending module 250 to produce a morphed light field 260 representing a morph of the source light field $L_0$ 210 and the target light field $L_1$ 220. This morphed light field 260 is then either stored to a computer readable medium, or, in one embodiment, it is provided to a light field rendering module 270 which then renders the morphed light field from any desired view point. Further, it should be noted that such morphs may also be used in creating additional morphs so as to create a sequence of gradual morphed views between the objects or models represented by the source and target light fields.

3.0 Operation Overview:

As noted above, the light field morpher generally operates by using light field morphing to produce a morphed view given a source and target 3D object represented by light fields. Specific details regarding implementation of the light field morpher are provided in the following sections.

In general, the light field morphing problem can be stated as follows: Given the source and target light fields $L_0$ and $L_1$ representing objects $O_0$ and $O_1$, construct a set of intermediate light fields $\{L_\alpha | 0 < \alpha < 1\}$ that smoothly transforms $L_0$ and $L_1$, with each $L_\alpha$ representing a plausible object $O_\alpha$ having the essential features of $O_0$ and $O_1$. This intermediate light field $L_\alpha$ is referred to herein as a "light field morph," or simply a "morph."

Light field morphing is an image-based 3D morphing technique that is not based on 3D surface reconstruction. The basis of light field morphing is "ray correspondence," i.e., the correspondence between rays of the source and target light fields. The role of ray correspondence in light field morphing is the similar to that of vertex correspondence in geometry-based 3D morphing. Further, like vertex correspondence, ray correspondence is controlled by user-specified feature elements. However, the implementation of light field morphing differs substantially from conventional geometry-based 3D morphing.

As noted above, the light field morpher includes a user interface (UI) for specifying feature elements in the source and target light fields. These feature elements include feature points, feature lines, feature polygons, and background edges. As described in further detail below, corresponding 3D feature polygons are simple to specify. These feature polygons partition areas of the light fields, $L_0$ and $L_1$, into groups of rays. The rays associated with a particular feature polygon P constitute a "ray bundle," and the ray correspondence of this ray bundle is controlled by control primitives of the feature polygon P. Note that feature polygons are not used to create a rough or approximate geometry of the underlying object, as they are needed only for those portions of the morph where there are visibility changes resulting from object shape changes.

Another issue addressed by light field morphing is visibility change. In general, with 3D morphing, there are two types of visibility changes. The first type of visibility change is due to viewpoint changes. In light field morphing, this type of visibility change is automatically addressed by warping of the input light fields. The second type of visibility change is that caused by object shape changes. In particular, for a given view, a "hole" or area of missing data is created when a hidden surface patch in the source light field $L_0$ becomes visible in the target light field $L_1$ due to an object shape change. The existence of such holes is determined using a "global visibility map" which is automatically generated from the feature polygons specified for each light field. These holes may be arbitrarily large and thus cannot be dealt with properly by traditional image warping methods. Instead, this problem is addressed using "ray-space warping." With ray-space warping, holes are filled by approximating an occluded ray with a "nearest visible ray."

3.1 System Components:

In general, the light field morpher consists of two primary components. The first of these two components is a UI for specifying feature element pairs through side-by-side interactive displays of the source and target light fields. As noted above, there are three types of feature elements: feature lines, feature polygons, both delimited by feature points, and background edges. The second component is a morphing unit that automatically computes a morph $L_\alpha$ for a given $\alpha$ through the following steps. First, the feature elements of $L_\alpha$ are obtained by interpolating the feature elements of $L_0$ and $L_1$ specified via the UI. Second, $L_0$ and $L_1$ are warped to $\hat{L}_0$ and $\hat{L}_1$ respectively to provide for feature element alignment. Finally, $L_\alpha$ is obtained by blending the warped light fields $\hat{L}_0$ and $\hat{L}_1$.

Conventional light field notation, as is well known to those skilled in the art, is used through the following description. In particular, an image plane is referred to herein as the (u,v)-plane, while a camera plane is referred to herein as the (s,t)-plane. A given light field, L, can be considered as either as a collection of images $\{L_{(s,t)}\}$ or as a set of rays $\{L(u,v,s,t)\}$. Further, an image, $L_{(s_0,t_0)}$, is referred to as a view of the light field L. Therefore, in an image $L_{(s_0,t_0)}$, a pixel at position $(u_0,v_0)$ is denoted as $L_{(s_0,t_0)}(u_0,v_0)$, which is equivalent to ray $L(u_0,v_0,s_0,t_0)$.

Figure 3A:
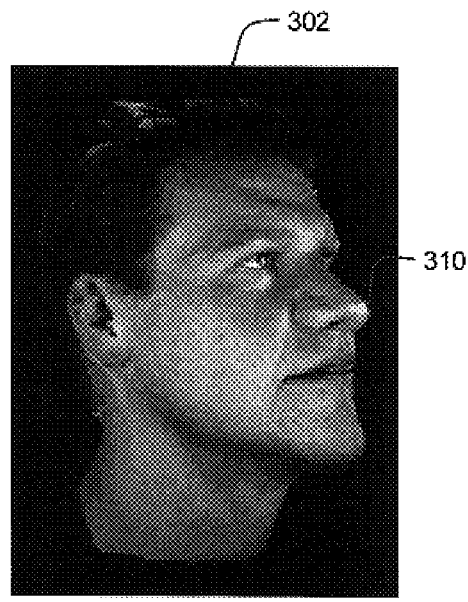
FIG. 3A illustrates a feature point selected in a projection of a 3D model for use with the light field morpher.
Figure 3B:
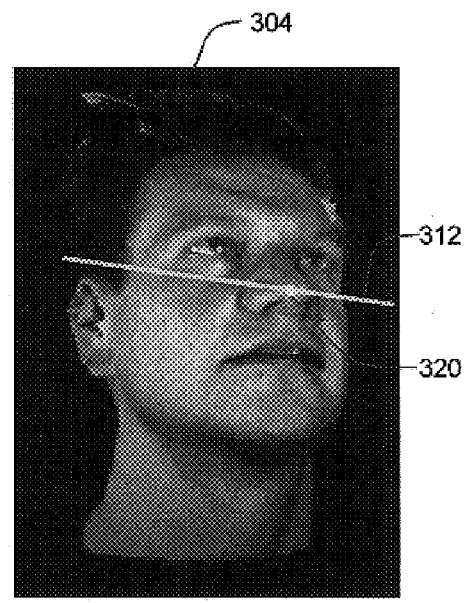
FIG. 3B illustrates an epipolar line corresponding to the feature point of FIG. 3A projected onto a 3D model, and a corresponding feature point along the length of the epipolar line.

3.2 Feature Elements:

As noted above, the user interface is used to specify feature element pairs consisting of feature lines, feature polygons, and background edges for the input light fields $L_0$ and $L_1$. These features elements are illustrated in FIG. 3A through FIG. 3D. In particular, the face model 302 in FIG. 3A shows a feature point 310 selected on the tip of the nose. A corresponding feature point 320 is shown on the nose of the face model 304 represented by the face in FIG. 3B. Further, a feature line 336 is illustrated on the face model 306 of FIG. 3C. This feature line 336 is defined by feature points 332 and 334. FIG. 3D illustrates a corresponding feature line 346 which is defined by feature points 342 and 344 on face model 308. Note that feature point 342 corresponds to feature point 332, while feature point 344 corresponds to feature point 352.

Figure 3C:
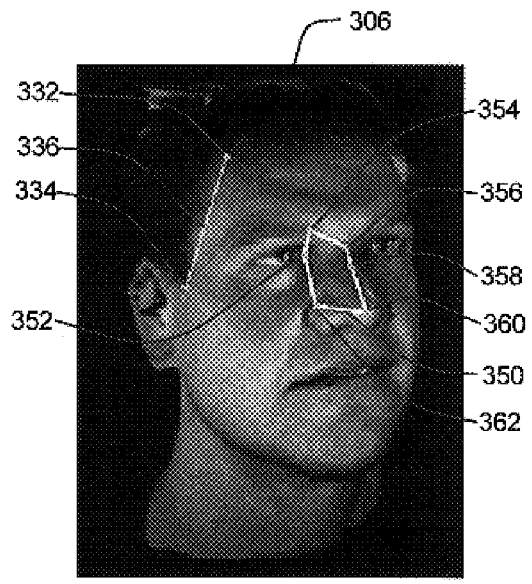
FIG. 3C illustrates a feature line and a feature polygon in a projection of a 3D model for use with the light field morpher.
Figure 3D:
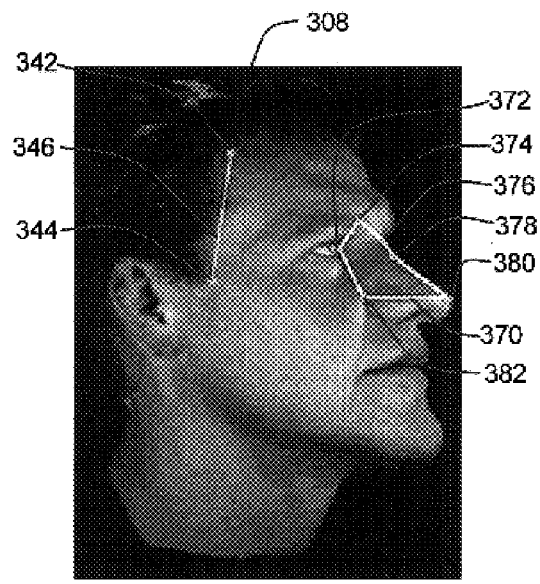
FIG. 3D illustrates a projection of a 3D model having a feature line and a feature polygon corresponding to the feature line and the feature polygon of FIG. 3C.

Further, also as illustrated by FIG. 3C, a feature polygon 350 is defined by feature points 352, 354, 356, 358, 360 and 362. Similarly, as illustrated by FIG. 3D, a corresponding feature polygon 370 is defined by feature points 372, 374, 376, 378, 380 and 382. As with the corresponding feature lines, feature points 372, 374, 376, 378, 380 and 382 correspond to feature points 352, 354, 356, 358, 360 and 362, respectively.

3.2.1 Feature Lines:

Feature lines are 3D line segments connecting two points or vertices. These vertices are referred to herein as "feature points." The purpose of a feature line is to approximate a curve on the surface of a 3D object. The user specifies a feature line E by identifying the pixel locations of its vertices $v_i$. Once E is specified, the light field morpher displays E on top of an interactive rendering of the light field displayed in the user interface.

In one embodiment, the 3D position of each vertex v of a feature line is determined using "epipolar geometry-guided manual correspondence." The concept of using epipolar geometry for solving a pixel correspondence problem between two images given known camera orientations and centers is well known to those skilled in the art, and will not be described in detail herein. However, in the context of the light field morpher, epipolar geometry is used to assist a user in identifying a corresponding point in a view of the second light field given a manual selection of a point in the first light field.

For example, when a user identifies a projection $p_1(v)$ of a vertex v in view $L_{(s_1,t_1)}$ of the light field representing the first 3D model, an epipolar line is automatically computed for that projection given the known camera parameters representing view $L_{(s_1,t_1)}$. Because the camera parameters for each view of the light field are known, automatic computation of that epipolar line is easily computed based on the optical center for the current view, $L_{(s_1,t_1)}$, of the light field representing the first 3D model. As is known to those skilled in the art, this epipolar line represents all possible physical points in a 3D space that could have produced the selected projection, $p_1(v)$, given the known optical center of the model.

After the 3D epipolar line has been computed from the selected projection, $p_1(v)$, of the light field, $L_{(s_1,t_1)}$, representing the first 3D model, that epipolar line is then simply projected onto a view, $L_{(s_2,t_2)}$, of the light field of the second 3D model. Note that in accordance with the concepts of epipolar geometry, any projection, $p_2(v)$, of the view $L_{(s_2,t_2)}$ corresponding to the selected projection $p_1(v)$ of $L_{(s_1,t_1)}$ must lie along the computed epipolar line of $p_1(v)$. Consequently, the projected epipolar line is then used as a guide for specifying the corresponding projection $p_2(v)$ of vertex v in view $L_{(s_2,t_2)}$ of the light field of the second 3D model. Consequently, manual selection of the corresponding projection in view $L_{(s_2,t_2)}$ is simplified because the user is limited to selecting a point along the projected epipolar line rather than being required to select a projection from all points in view $L_{(s_2,t_2)}$. Further, constraining user selection of corresponding projections in this manner also serves to increase the accuracy of the selection of corresponding projections.

In other words, in one embodiment, the user manually identifies projections $p_1(v)$ and $p_2(v)$ of vertex v in two different views $L_{(s_1,t_1)}$ and $L_{(s_2,t_2)}$ under the guidance of epipolar geometry. In particular, after the user specifies $p_1(v)$ in view $L_{(s_1,t_1)}$, the epipolar line of $p_1(v)$ is drawn in view $L_{(s_2,t_2)}$ as a guide for specifying $p_2(v)$. Since $p_2(v)$ must be on the epipolar line of $p_1(v)$, that selection is greatly simplified. Further, because the camera parameters of both views are known, calculating v from $p_1(v)$ and $p_2(v)$ is straightforward.

For example, as illustrated with respect to the face models of FIG. 3A and FIG. 3B, once a feature point 310 is specified on the first model 302, an epipolar line 312 corresponding to that feature point is displayed on the second model 304. The user then simply identifies the corresponding point 320 along the length of that epipolar line 312. Given the selected feature points 310 and 320 (i.e., the selected projections), and the known camera parameters for the view of both models, 302 and 304, the vertex v associated with those feature points is then easily computed.

3.2.2 Feature Polygons:

A feature polygon P is a 3D polygon defined by n feature lines, $\{E^1, \ldots, E^n\}$ which are called the edges of P. P has control primitives $\{E^1, \ldots, E^{n+k}\}$ which includes both the edges of P and supplementary feature lines $\{E^{n+1}, \ldots, E^{n+k}\}$ for additional control inside the feature polygon. The purpose of a feature polygon is to approximate a surface patch of a 3D object. In general, P is allowed to be non-planar so that it can approximate a large surface patch as long as the surface patch is relatively flat. To specify a feature polygon, the user draws a series of connected feature lines, with each two consecutive lines sharing a vertex v in either clockwise or counterclockwise order in the interactive display of a light field.

As noted above, to ensure that the patches are well approximated by feature polygons, the geometry of the patches is restricted. In particular, for a surface patch S approximated by a feature polygon P, there is a requirement that S has no self-occlusion and is relatively flat. The surface patch S is automatically split into smaller feature polygons P if either requirement is not met. By requiring S to have no self-occlusion, self-occlusion in P is avoided if it is a sufficiently close approximation of S. For such a P, it is only necessary to check occlusion caused by other feature polygons during visibility processing.

Figure 4:
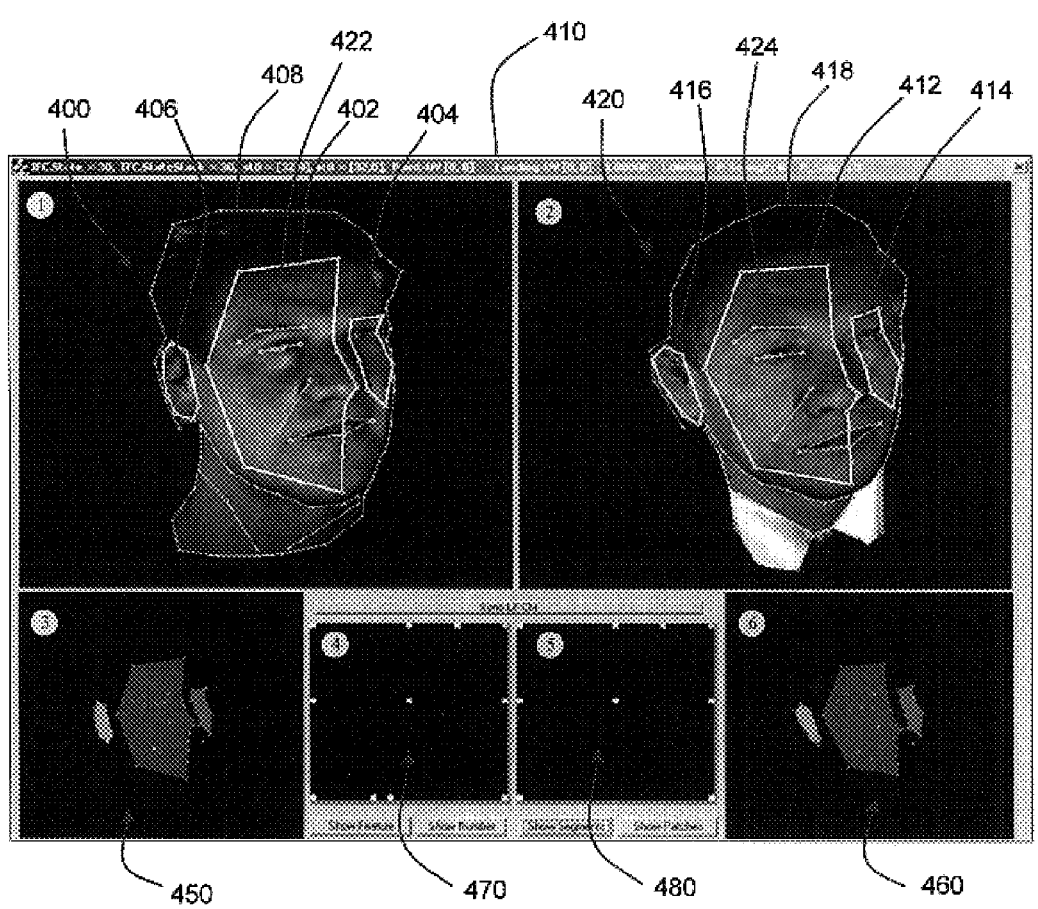
FIG. 4 illustrates an exemplary user interface for specifying light field features.

Note that whether S satisfies the two conditions is solely judged within the current viewing range of L. For example, consider a rendered face model 400 in an exemplary user interface window 410, as illustrated by FIG. 4. The surface patch approximated by a feature polygon 402 has no self-occlusion for the viewing range of the light field shown. However, when the viewpoint moves beyond the viewing range of this light field, e.g., to the right side of the face, the nose will cause self-occlusion within the surface patch 402.

3.2.3 Background Edges:

Background edges are used to control rays that do not belong to any feature polygons. These rays exist for two reasons. First, feature polygons only roughly approximate surface patches of a 3D object. In each light field view, rays near the object silhouette may not be covered by the projection of any feature polygons. Second, parts of the object surface may not be affected by the visibility change caused by object shape change, and, as noted above, there is no need to specify feature polygons for the corresponding rays.

Thus, for rays that do not belong to any feature polygons, they are controlled with background edges. These background edges are 2D image edges that are manually specified by the user. Background edges play the same role as feature edges in conventional 2D image morphing. A series of connected background edges form a background polyline. As illustrated in FIG. 4, background polylines 408 and 418 are manually specified in a few key views and interpolated into other views by linear interpolation.

3.2.4 Exemplary User Interface for Specifying Feature Elements:

As noted above, FIG. 4 illustrates an exemplary user interface window 410 for interacting with the light field morpher described herein to provide feature specification for the source and target light fields. In particular, the upper portion of the exemplary user interface window 410 provides side-by-side interactive renderings of the source and target light fields, 400 and 420, respectively. Clearly, the particular layout of the user interface window 410 described herein may be rendered in any number of similar arrangements without adversely effecting the performance of the light field morpher.

Feature lines, 422 and 424 are drawn by specifying two or more feature points, as described above to form polylines. Feature polygons 402, 404, and 406 are drawn using wireframe rendering on top of the source light field rendering 400 by specifying feature points around the circumference of the feature polygons. Further, because the feature points are made to correspond between the source 400 and target 420 light field renderings, as described above, the feature polygons, 412, 414, and 416, drawn on the target rendering also correspond to the feature polygons, 402, 404, and 406, respectively, drawn on the source rendering. Note that as discussed above, correspondence of feature points is assisted in one embodiment by using epipolar lines to guide the user in identifying corresponding points.

Background edges 408 and 418 are also drawn as polylines by specifying the points of the background edges in the same manner as for feature points. Further, in this exemplary user interface, windows (3) and (6) provide interactive renderings of the global visibility maps, 450 and 460, respectively, showing the visibility of the specified feature polygons. Finally, windows (4) and (5) of FIG. 4 display the (s,t)-planes, 470 and 480, respectively, of the two light fields, 400 and 420, respectively, with each dot representing a key view used for specifying background edges.

3.3 Global Visibility Map:

After specifying all feature elements of a light field L as described above, a "global visibility map," V, or simply "visibility map" for short, of L is computed. The global visibility map of a light field L with feature polygons $\{P_1, \ldots P_{n_p}\}$ is a mapping V:L→N from the ray space L to a set of integers N such that $$V(u, v, s, t) = \begin{cases} i & \text{if ray } L(u, v, s, t) \text{ belongs to } P_i \\ -1 & \text{otherwise} \end{cases} \quad \text{Equation 1}$$

Intuitively, V may be regarded as a light field of false colors, with V(u,v,s,t) indicating an identification of the feature polygon visible at ray L(u,v,s,t). Window (3) of FIG. 4 provides an example of a rendered visibility map, V 450, corresponding to the feature polygons 402, 404 and 406 of the face model 400 in window (1) of FIG. 4. Similarly, window (6) of FIG. 4 provides an example of a rendered visibility map, V 460, corresponding to the feature polygons 412, 414 and 416 of the face model 400 in window (1) of FIG. 4. Note that the visibility map 450 corresponds to the visibility map 460 because the feature points, and thus the feature polygons of the two models, 400 and 420, correspond.

3.3.1 Visibility Computation:

The visibility map V is computed based on the vertex geometry of feature polygons as well as the fact that feature polygons have no self-occlusion by construction, as discussed above. The basic idea is to calculate the visibility of a set of relatively flat but non-planar polygons. While this calculation can be accomplished in a number of ways, in a tested embodiment of the light field morpher, the calculation was done efficiently using OpenGL.

In particular, consider rendering a non-planar polygon $P_i$ into a view L(s,t). One problem with this rendering is that the projection of $P_i$ into the view L(s,t) may be a concave polygon, which OpenGL cannot display correctly. However, one simple solution to this problem is to use a two-pass rendering method using the OpenGL stencil buffer. This method works for feature polygons since they have no self-occlusion as described above. Alternatively, also as noted above, the visibility map computation can be simplified by simply restricting feature polygons to be triangles without supplementary feature lines. However, as discussed above, one drawback to this approach is that the user will be required to draw a larger number of feature polygons, thereby increasing the interaction time needed for a user to complete feature specification for model pairs.

3.3.2 Ray Bundles:

Based on the visibility map V, the rays of L are then grouped according to their associated feature polygons. These grouped rays are referred to herein as a "ray bundle," and denoted as $R(P_i)$ where $P_i$ is the associated feature polygon. As is known to those skilled in the art, the concept of "ray bundles" has been used previously in the context of global illumination. As discussed in further detail below, $R(P_i)$ can be warped using ray-space warping with the control primitives of $P_i$. As discussed in detail in Section 3.4, this warping is accomplished using a ray-space warping equation provided as Equation 2. The ray correspondence of $R(P_i)$ is thus completely determined by the control primitives of $P_i$. As noted above, rays that do not belong to any ray bundle are called background rays. Background rays are controlled by the background edges.

Figure 5:
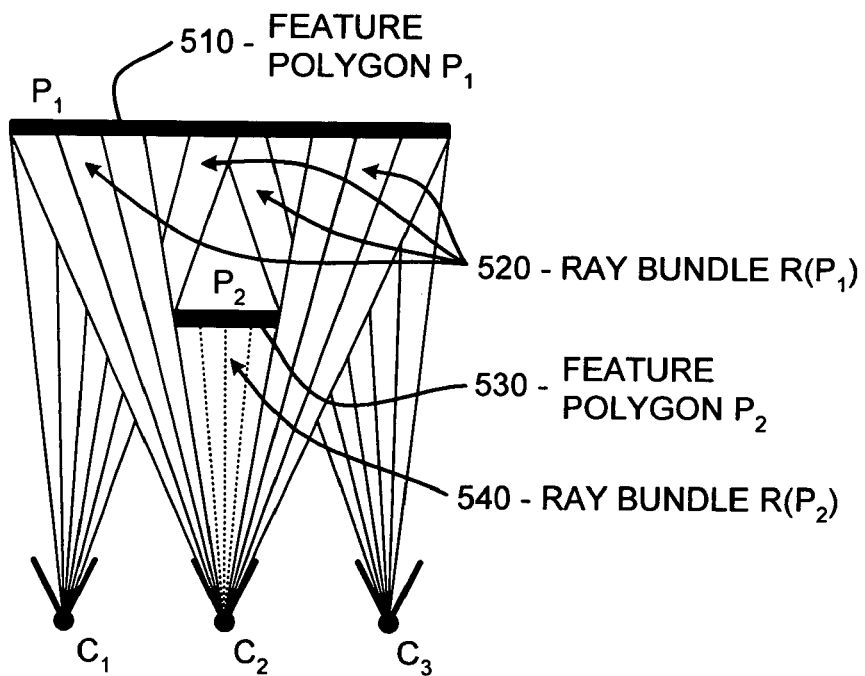
FIG. 5 illustrates an example of ray bundles associated with feature polygons.

FIG. 5 provides a simple graphical illustration of ray bundles. In particular, FIG. 5 shows a plan view of rays emanating from three origins represented by cameras $C_1$, $C_2$, and $C_3$ for a view of two feature polygons $P_1$ 510 and $P_2$ 530. As illustrated by FIG. 5, the rays associated with the feature polygon $P_1$ 510 across all views of the light field, i.e., the corresponding views from all three cameras $C_1$, $C_2$, and $C_3$, are bundled together to form ray bundle $R(P_1)$ 520. Note that some of the rays from camera $C_2$ do not view feature polygon $P_1$ 510 because feature polygon $P_1$ is partially occluded by feature polygon $P_2$ 530 with respect to camera $C_2$. Similarly, the rays associated with the feature polygon $P_2$ 530 across all views of the light field, i.e., the corresponding views from all three cameras $C_1$, $C_2$, and $C_3$, are bundled together to form ray bundle $R(P_2)$ 540. Note that in this case, the feature polygon $P_2$ 530 is only in the field of view of camera $C_2$, even though feature polygon $P_2$ is not occluded by other feature polygons.

3.4 Warping:

As noted above, for each 0<α<1, a light field morph $L_\alpha$ is obtained by blending two light fields $\hat{L}_0$ and $\hat{L}_1$, which are warped from $L_0$ and $L_1$ to produce feature alignment. Note that the following discussion addresses only the warping from $L_0$ to $\hat{L}_0$ since the warping from $L_1$ to $\hat{L}_1$ is essentially the same. Thus, an additional discussion of the warping from $L_1$ to $\hat{L}_1$ would simply be redundant.

In general, the warping from $L_0$ to $\hat{L}_0$ is accomplished by the following steps: (1) Calculate feature polygons and background edges of $\hat{L}_0$; (2) Build the visibility map of $\hat{L}_0$; (3) Compute ray bundles of the warped light field $\hat{L}_0$; and (4) Treat background rays.

3.4.1 Basic Ray-Space Warping:

Because the rays of a light field L are grouped ray bundles, as noted above, the basic idea behind light field warping is to warp a ray bundle $R(P_i)$. As noted above, L is typically comprised of N n-sided feature polygons. However, for purposes of explanation, assume that L has only one n-sided feature polygon $P_i$, whose feature lines are $\{E^1, \ldots, E^{n+k}\}$ before warping and whose feature lines are $\{\hat{E}^1, \ldots, \hat{E}^{n+k}\}$ after warping.

Ray-space warping regards the warped light field $\hat{L}$ as a 4D ray space and directly computes color values of individual rays:

$$\hat{L}(u,v,s,t) = L(u',v',s',t'), \text{ where}$$

$$(u',v')^T = f(u,v,E_{(s',t')}^1, \ldots, E_{(s',t')}^{n+k}, \hat{E}_{(s,t)}^1, \ldots, \hat{E}_{(s,t)}^{n+k}) \quad \text{Equation 2}$$

and (s',t') are free variables in the (s,t)-plane. The vector function f( ) is the well known Beier-Neely field warping function. In particular, for a given point (u,v) in view $\hat{L}(s,t)$, f( ) finds a preimage (u',v') in view $L_{(s',t')}$ based on the correspondence between the feature lines $E_{(s',t')}^1, \ldots, E_{(s',t')}^{n+k}$ in $L_{(s',t')}$ and $\hat{E}_{(s,t)}^1, \ldots, \hat{E}_{(s,t)}^{n+k}$ in $\hat{L}(s,t)$.

For each ray $\hat{L}(u,v,s,t)$, the basic ray-space warping provides a set of rays $\{L(u',v',s',t')\}$ whose colors are assigned to $\hat{L}(u,v,s,t)$. Possible values of (s',t') include (s,t), in which case ray-space warping yields the same result as conventional image warping.

3.4.2 Light Field Warping:

To warp the light field $L_0$ to $\hat{L}_0$, the basic warping methods described above are applied to the feature polygons of $L_0$. As noted above, this warping is accomplished by four basic steps, including (1) Calculating feature polygons and background edges of $\hat{L}_0$; (2) Building the visibility map of $\hat{L}_0$; (3) Computing ray bundles of the warped light field $\hat{L}_0$; and (4) Treating the background rays.

In particular, the first step involves computing the feature polygons and background edges of $\hat{L}_0$. In performing this computation, the vertices of feature lines in $\hat{L}_0$ and $\hat{L}_1$ are interpolated from their counterparts of $L_0$ and $L_1$, respectively. For example, for i=0,1, let $\{v_1^i, \ldots v_n^i\}$ be the vertices of feature lines in $L_i$. The vertices of feature lines in $\hat{L}_0$ are $\{\hat{v}_1, \ldots \hat{v}_n\}$, where:

$$\hat{v}_k = (1-\alpha) v_k^0 + \alpha v_k^1, \, k=1, \ldots, n \quad \text{Equation 3}$$

Note that the connections between the vertices are by nature the same in $\hat{L}_0$ and $L_0$. Consequently, the feature polygons of $\hat{L}_0$ as well as their control primitives are easily obtained since the connections are already known.

In the second step, the visibility map of $\hat{L}_0$ is built, as described above, in order to obtain information about the visibility changes caused by object shape change. Using the edge geometry of the feature polygons of $\hat{L}_0$, the visibility calculation of these polygons is performed, with non-planar polygons rendered by the view-dependent triangulation as noted above. The result of this visibility calculation is the visibility map of $\hat{L}_0$.

In the third step, the warped ray bundles of light field $\hat{L}_0 = \{\hat{L}_{0\,(s,t)}\}$ are computed on a view-by-view basis for every view. In general, in processing ray bundle $R(\hat{P}_0)$ in view $\hat{L}_{0\,(s,t)}$ for feature polygon $\hat{P}_0$ that corresponds to feature polygon $P_0$ in $L_0$, $\hat{L}(u,v,s,t)$ is evaluated in three steps consisting of "visibility testing," "pixel mapping," and "ray-space warping."

In particular, visibility testing involves simply checking the pre-computed visibility map of $L_0$ to see whether $P_0$ is visible at ray $L_0(u',v',s,t)$, as determined by the ray-space warping, Equation 2, with (s',t')=(s,t). Next, for pixel mapping, if $P_0$ is visible at ray $L_0(u',v',s,t)$, then:

$$\hat{L}_0(u,v,s,t) = L_0(u',v',s,t) \quad \text{Equation 4}$$

However, if $P_0$ is visible not at ray $L_0(u',v',s,t)$, then $\hat{L}_{0\,(s,t)}(u,v)$ is in a "hole" and ray-space warping is then used to fill that hole. The basic ray-space warping described earlier provides a set of values $\{L_0(u',v',s',t')\}$ parameterized by free variable (s',t'). Using the visibility map of $L_0$, a search for the "nearest visible ray" $L_0(u',v',s',t')$ is made such that $P_0$ is visible at ray $L_0(u',v',s',t')$, as determined by the ray-space warping Equation 2, such that (s',t') is as close to (s,t) as possible. This search starts from the immediate neighbors of (s,t) in the (s,t)-plane and propagates outwards, accepting the first valid (s',t'). Note that the search will never fail because $P_0$ will always be fully visible in at least one view of $L_0$, because, as discussed above, any feature polygons having self occlusion are automatically broken into smaller feature polygons. Once (s',t') is found, then, in accordance with Equation 2:

$$\hat{L}_0(u,v,s,t) = L_0(u',v',s',t')$$

The basic idea behind choosing the "nearest visible ray" is that for $\hat{L}_0(u,v,s,t)$, the basic ray-space warping provides a set of values $\{L_0(u',v',s',t')\}$ from which a valid pixel color can be obtained. Under a Lambertian surface assumption, all rays are equally valid. However, the Lambertian surface assumption only approximately holds despite its widespread use in conventional image-based rendering schemes. By choosing the visible ray nearest to ray $L_0(u',v',s',t')$ when $P_0$ is occluded at the latter, the error caused by the Lambertian surface assumption is minimized. Note that for the "nearest visible ray", a visible ray $L_0(u',v',s',t')$ with (s',t') is chosen to be as close to (s,t) as possible. Any of a number of conventional closeness metrics may be used.

Finally, in the fourth step of light field warping, the background rays are treated to complete the warping of the light field. As noted above, these background rays correspond to pixels not covered by the projection of any of the feature polygons. Consequently, conventional image warping is applied to these pixels by simply using the background edges and projected feature polygon edges as control primitives.

Figure 6:
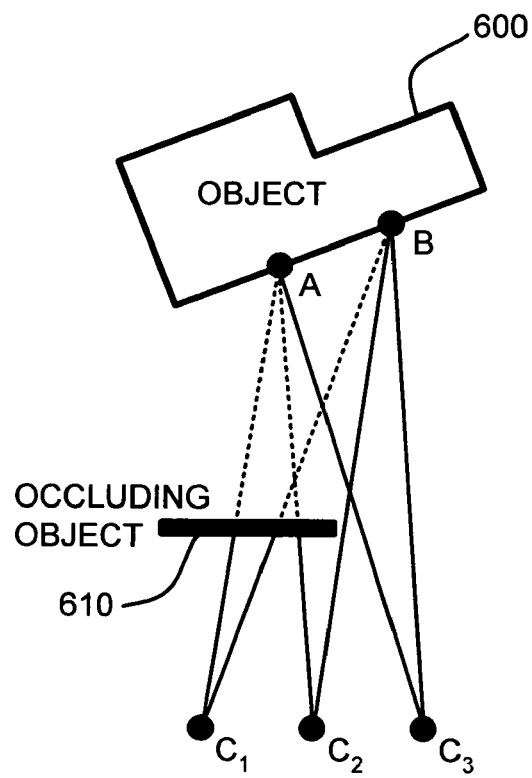
FIG. 6 illustrates an example of nearest visible rays in a light field.

FIG. 6 provides a simple example of selecting nearest visible rays in a light field with three cameras. In particular, as illustrated by FIG. 6, points A and B on an object 600 are occluded by an occluding object 610 with respect to a first camera, $C_1$. Similarly, point A on the object 600 is occluded with respect to a second camera $C_2$, while point B on the object is visible to camera $C_2$. Finally, both points A and B on the object 600 are visible with respect to a third camera $C_3$. Consequently, because both points A and B are occluded with respect to camera $C_1$, a nearest visible ray must be selected to fill a hole that would otherwise be visible. As can be seen from FIG. 6, the nearest visible ray for point A with respect to camera $C_1$ is the ray representing the view of point A from camera $C_3$. Consequently, ray $C_1A$ is replaced by ray $C_3A$ to fill the hole resulting from the occlusion. Similarly, occluded ray $C_1B$ is replaced by ray $C_2B$, because the ray from the camera $C_2$ view of point B is closer to the occluded $C_1$ view than is the view of point B from the camera $C_3$ view.

Finally, ray $C_2A$ is replaced by ray $C_3A$ to complete the filling of the hole caused by the occluding object 610 with respect to cameras $C_1$ and $C_2$.

The concepts described above are illustrated by FIG. 7A through FIG. 7F. In general, FIGS. 7A through 7C provide an example of feature interpolation. Specifically, FIGS. 7A, 7B, and 7C show alternate views of a rendered light field $L_0$ with feature lines 712, 714 and 716, respectively, with areas that are occluded in each view, i.e., portions of the right front leg of the animal model represented by rendered light field $L_0$, being outlined to show the occlusion in each view, 722, 724 and 726, respectively.

Further, FIGS. 7D through 7F illustrate the results of filling a hole based on selecting the nearest visible rays. In particular, FIG. 7D illustrates the same light field as that of FIG. 7A, showing a portion of the right front leg of the animal model represented by rendered light field $L_0$ being occluded 732 by the left front leg 734. FIG. 7E illustrates a view of the warped light field $\hat{L}_0$, with the area 736 highlighted in green representing a hole corresponding to the occluded part of the right front leg in FIG. 7D. Finally, FIG. 7F illustrates light field $L_0$ viewed from a position where feature polygons representing the occluded portion of the right from leg 738 are fully visible. Consequently, the view represented by FIG. 7F could be used to select the nearest visible rays to fill the hole 736 illustrated in FIG. 7E.

3.4.3 Light Field Warping for Animation Sequences:

The aforementioned description is easily extensible to producing sequences of morphs. In particular, in one embodiment, the light field morpher described herein is used to produce animation sequences that allow a user to observe a morphing process from a camera moving along an arbitrary three-dimensional path. Further, given this arbitrary 3D path, a virtual camera representing a particular view does not have to be inside the (s,t)-plane.

One way to compute such a 3D morphing sequence is to first compute a sequence of light field morphs $M=\{L_0, L_{1/n}, \ldots, L_{(n-1)/n}, L_1\}$ and then create the 3D morphing sequence by rendering the light field morphs in M. Unfortunately, the computational expense and storage requirements for computing M can be very high. Consequently, a method for generating a 3D morphing sequence without fully evaluating the sequence M is used to reduce both the computational complexity and the storage requirements for evaluating the sequence M.

In particular, suppose that the viewing parameters $\alpha$ are provided, and that it is desired to compute the image $I_\alpha$ in the morphing sequence. From the known camera path and $\alpha$, the camera position $v_\alpha$ can be easily determined. In accordance with the preceding discussion, the image $I_\alpha$ is a blend of two images $\hat{I}_0$ and $\hat{I}_1$, where $\hat{I}_0$ is warped from $L_0$ and $\hat{I}_1$ is warped from $L_1$. The image $\hat{I}_0$ is warped from $L_0$ by first calculating, for each pixel $(x_\alpha, y_\alpha)$ in the image $\hat{I}_0$, its corresponding rays $(u_\alpha, v_\alpha, s_\alpha, t_\alpha)$ and then applying ray-space warping as described above. The image $\hat{I}_1$ is warped from $L_1$ in the same way. This process is then simply repeated for each morph in the animation sequence.

Figure 8:
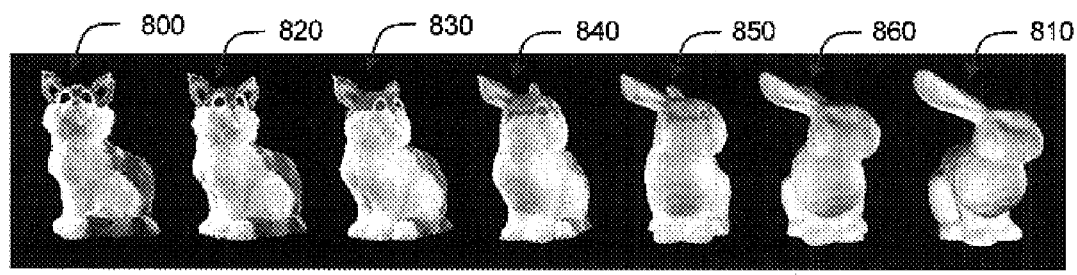
FIG. 8 illustrates source and target light fields, and a sequence of morphed 3D light fields generated from the source and target light fields.

FIG. 8 illustrates the results of a sequence of morphs created starting with a source light field 800 representing a real toy cat, and a target light field 810 representing a 3D model of a rabbit. Morphs 820 through 860 represent the sequence of morphs generated given the source and target light fields, 800 and 810, respectively.

3.5 Key-Frame Morphing:

When the input light fields are very sparse (e.g. 2 to 3 views per light field), light field morphing is referred to as herein "key-frame morphing" to emphasize its similarity to image morphing. Key-frame morphing can be regarded as a generalization of conventional view morphing because key-frame morphing allows a user to add more views as needed to eliminate holes caused by visibility changes. Note that although view morphing can generate morphing sequences that appear strikingly 3D, it is not a general scheme for image-based 3D morphing because the viewpoint is restricted to move along a prescribed line.

As noted above, key-frame morphing is light field morphing with very sparse light fields. The number of key frames needed depends on both the visibility complexity of the source and target objects and the presence of non-Lambertian surfaces. As should be expected, the quality of key-frame morphing improves as more views of the light field are used. For example, when there are a large number of visibility changes due to object shape change, more holes will need to be filled in the manner described above. In filling such holes, the closer the nearest visible ray is to the hole, the better the quality of the morphing. Thus, where more views are used, the nearest visible rays will generally be closer than where less views are used. This is especially evident for highly non-Lambertian surfaces, where morph quality has been observed to clearly improve as a function of the number of views used in creating the morphs where there are large numbers of visibility changes, as described above.

3.6 Plenoptic Texture Transfer:

As noted above, the light field morpher is also capable of transferring 3D textures from one object to another. In particular, given source and target objects $O_0$ and $O_1$ represented by light fields $L_0$ and $L_1$, respectively, the texture of $O_0$ is transferred onto $O_1$ by constructing a morphed light field $L_{01}$ which represents the structure of $O_1$ and the textures of $O_0$. In general, this plenoptic texture transfer is accomplished by first setting the feature elements of $L_{01}$ to be the same as those for $L_1$, so as to ensure that the morphed light field $L_{01}$ will have the same shape and structure as the object, $O_1$, to which the texture of $O_0$ is being transferred. Next, $L_0$ is warped to $\hat{L}_0$ for feature alignment with $L_{01}$ in the manner described above. Finally, $L_{01}$ is created by assigning the warped light field $\hat{L}_0$ to $L_{01}$. Intuitively, the process described above can be explained as creating the morph $L_{01}$ using the feature elements of $L_1$ and the colors and radiance of $L_0$. Unlike conventional 2D texture transfer, this plenoptic texture transfer is a 3D effect. Further, it should be noted that for plenoptic texture transfer to work well, the two objects, $O_0$ and $O_1$, should be somewhat similar to avoid overly large texture distortions.

Figure 9:
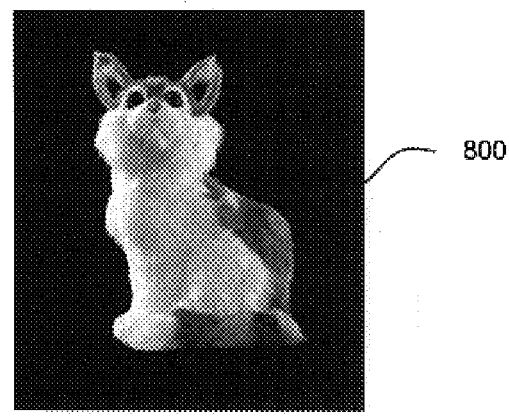
FIG. 9 illustrates a textured 3D model of a cat represented by the source light field of FIG. 8.
Figure 10A:
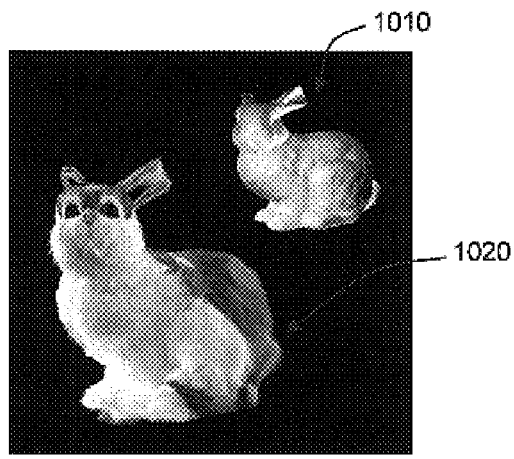
FIG. 10A illustrates a transfer of the texture of the 3D model of FIG. 9 to an un-textured model of a rabbit.
Figure 10B:
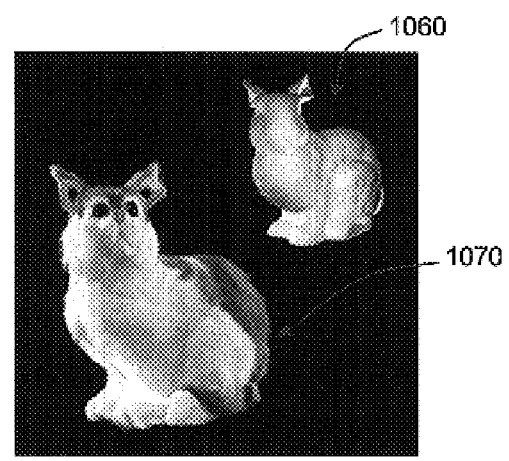
FIG. 10B illustrates a transfer of the texture of the 3D model of FIG. 9 to an un-textured model of a rabbit.

Examples of this plenoptic texture transfer are provided by FIGS. 9 through 10B. In particular, FIG. 9 is a view of the source light field 800 representing the real toy cat presented in FIG. 8. As illustrated by FIG. 10A, the light field morpher is capable of realistic plenoptic texture transfer from a source light field 800, to a target light field represented by a 3D model 1010 of a rabbit. The resulting morphed light field 1020 maintains the shape and structure of the 3D model 1010, with the 3D texture of the source light field 800. Similarly, FIG. 10B illustrates the same texture transfer to an alternate view 1060 of the rabbit model to produce a morphed light field 1070 that maintains the shape and structure of the 3D model 1060, with the 3D texture of the source light field 800.

4.0 System Operation:

As noted above, the program modules described in Section 2.2 with reference to FIG. 2, and in view of the detailed description provided in the preceding Sections, are employed in a "light field morpher" that provides a system and method for image-based 3D morphing and texture transfer of 3D objects. This process is generally depicted in the flow diagrams of FIGS. 11 and 12. It should be noted that the boxes and interconnections between boxes that are represented by broken or dashed lines in FIG. 11 represent alternate embodiments of the light field morpher, and that any or all of these alternate embodiments, as described below, may be used in combination with other alternate embodiments that are described throughout this document.

Figure 11:
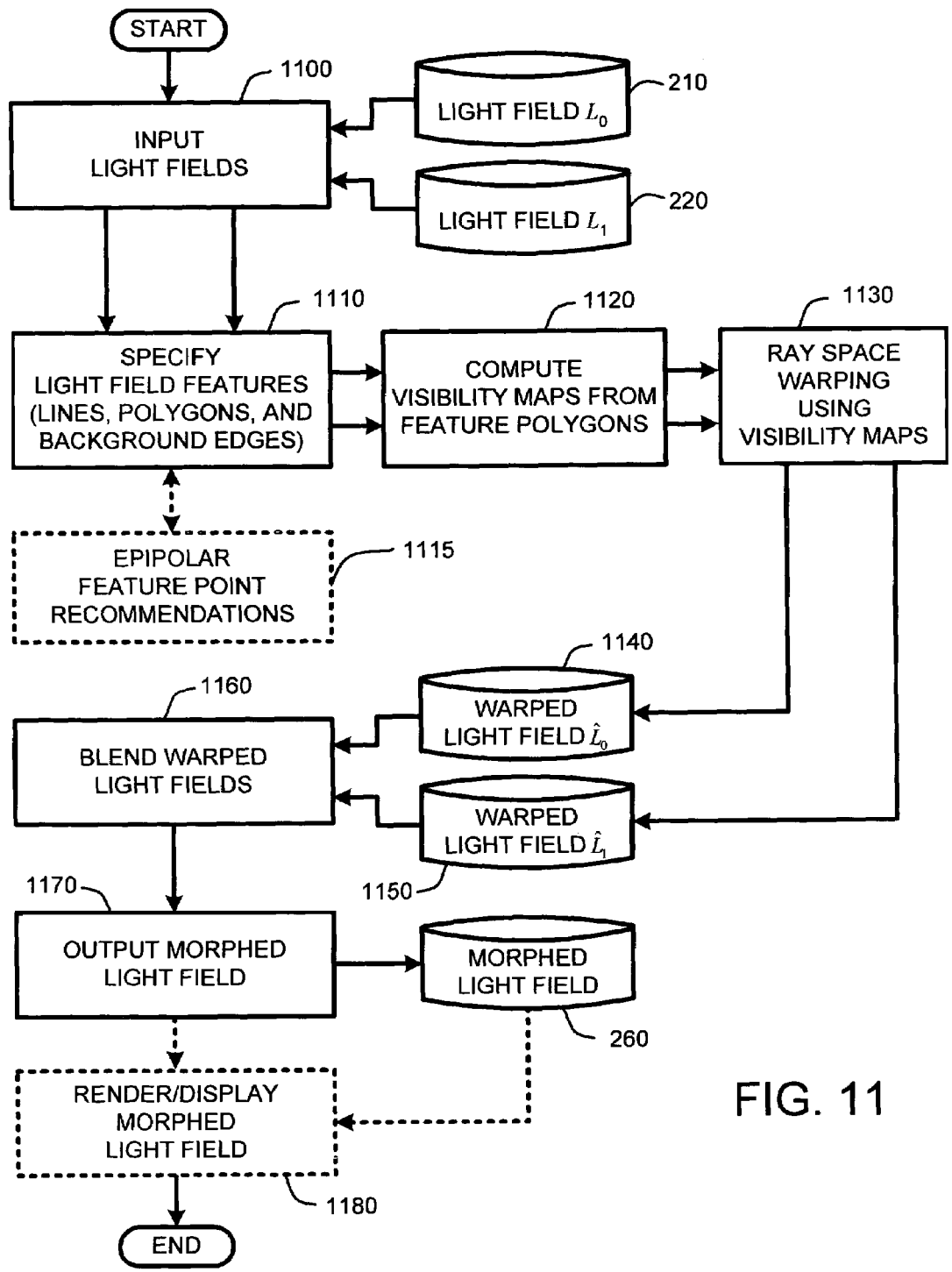
FIG. 11 illustrates an exemplary system flow diagram for performing 3D feature-based light field morphing and texture transfer.

Referring now to FIG. 11 in combination with FIG. 2, the process can be generally described as a system for providing interactive image-based 3D morphing and texture transfer of 3D objects by morphing light fields associated with source and target 3D models or objects. In general, as illustrated by FIG. 11, the light field morpher begins by inputting the source light field, $L_0$ 210, and the target light field $L_1$ 220. Once these light fields, 210 and 220, have been input, they are displayed side-by-side in an interactive user interface window for specifying 1110 the light field features for each light field in one or more views of those light fields. As discussed above, in one embodiment, epipolar feature point recommendations 1115 are provided via an epipolar line for assisting the user in identifying corresponding feature points in each light field view.

Given the light fields, 210 and 220, and the feature elements of each light field, the next step is to compute visibility maps 1120 for each light field based on the feature polygons specified for each light field. These visibility maps are then used in a ray-space warping step 1130 to generate warped light fields $\hat{L}_0$ 1140, and $\hat{L}_1$ 1150 by aligning the feature elements of each light field 210 and 220. The warped light fields $\hat{L}_0$ 1140, and $\hat{L}_1$ 1150 are then blended 1160 to produce a composite light field which is then output 1170 as the morphed light field 260. As discussed above, this light field blending 1160 can use any of a number of conventional blending, feathering, and deghosting techniques for creating the composite light field representing the morphed light field 260. Finally, the morphed light filed 260 is either stored for later use, or rendered 1180 from any desired viewpoint.

Figure 12:
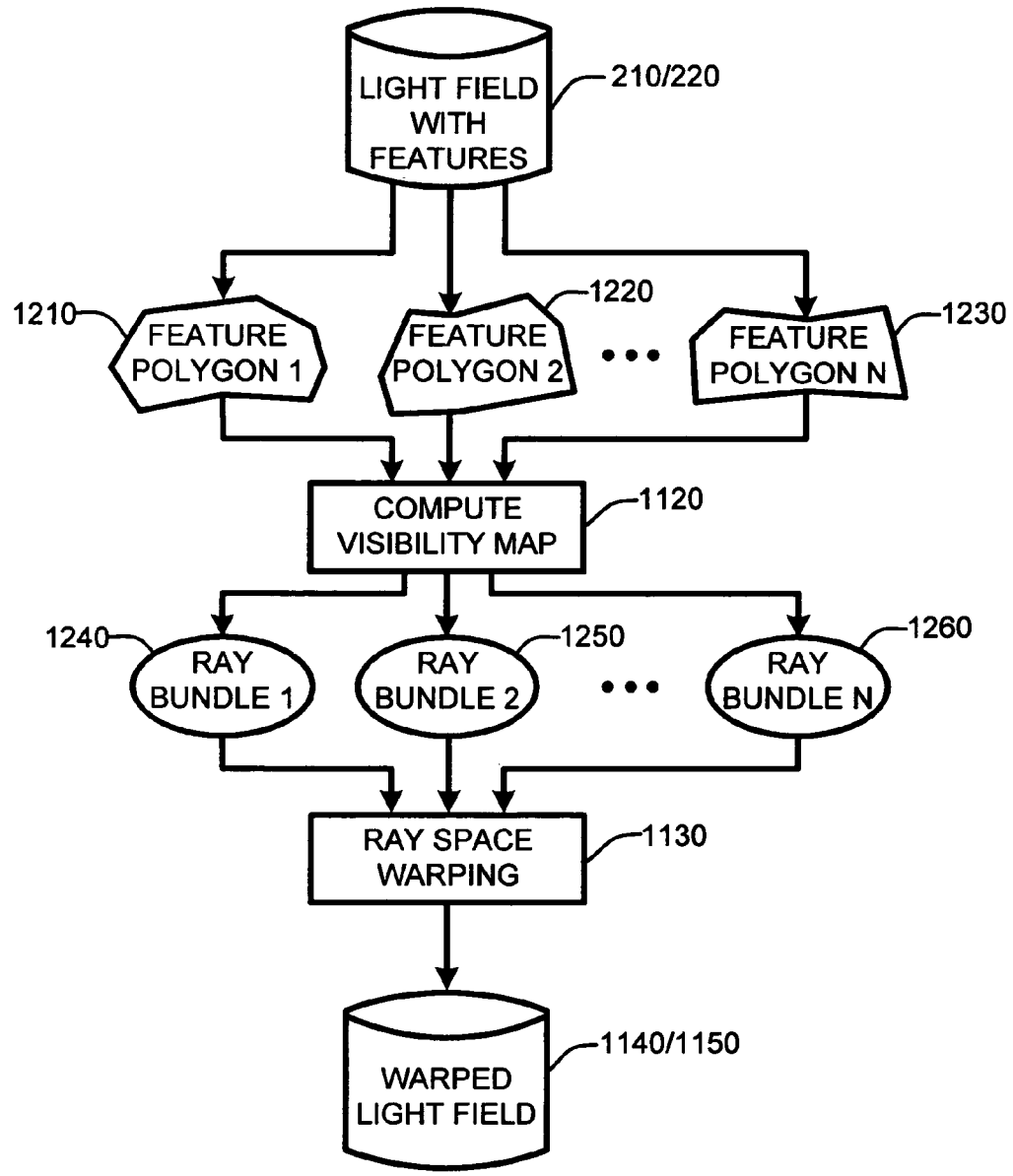
FIG. 12 illustrates an exemplary system flow diagram for computing visibility maps from feature polygons and warping light fields based on the visibility maps.

Referring now to the flow diagram of FIG. 12 in combination with FIG. 2 and FIG. 11, the basic light field warping process is illustrated. In particular, given a light field 210 or 220, and the feature polygons, 1210, 1220, and 1230, for that light field, the first step is to compute a global visibility map 1120 for the light field. As discussed above, this global visibility map describes the visibility of the feature polygons for each light field. Given the global visibility map, ray bundles, 1240, 1250, and 1260, corresponding to each feature polygon, 1210, 1220, and 1230, respectively, are computed. As discussed above, these ray bundles, 1240, 1250, and 1260, are basically groupings of all rays that "view" a particular feature polygon, 1210, 1220, and 1230, respectively, from each view of the light field.

Ray space warping 1130 is then applied to the ray bundles, 1240, 1250, and 1260, representing each light field 210 or 220. Further, because the ray bundles include all rays from each view which "view" each feature polygon, one or more nearest rays are automatically selected during the ray-space warping step 1130 for filling holes that would otherwise result from occlusion caused by object shape change as a result of the warping. The result of the ray-space warping 1130 is a warped light field 1140 or 1150, which is then used in the manner described above for creating morphed light fields.

The foregoing description of the light field morpher has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically morphing four-dimensional (4D) light fields, comprising:
   providing a source light field representing a first 3D object;
   providing a target light field representing a second 3D object;
   specifying corresponding feature elements in at least one view of both the source and target light fields;
   warping the source and target light fields to align the feature elements; and
   blending the warped light fields to produce a composite light field representing a morphed light field.

2. The system of claim 1 further comprising rendering the morphed light field to produce at least one 3D view of a morphed object represented by the morphed light field.

3. The system of claim 1 wherein specifying corresponding feature elements in at least one view of both the source and target light fields comprises:
   specifying at least one feature point in the source light field;
   specifying a corresponding feature point in the target light field for each feature point specified in the source light field; and
   defining at least one feature polygon in the source light field using the specified feature points, and at least one corresponding feature polygon in the target light field using the corresponding feature points.

4. The system of claim 3 further comprising defining at least one feature line in the source light field using the specified feature points, and at least one corresponding feature line in the target light field using the corresponding feature points.

5. The system of claim 3 further comprising defining at least one background edge in the source light field using the specified feature points, and at least one corresponding background edge in the target light field using the corresponding feature points.

6. The system of claim 3 wherein specifying the corresponding feature point in the target light field for each feature point specified in the source light field comprises specifying a point on an epipolar line drawn on the target light field that corresponds to each feature point specified in the source light field.

7. The system of claim 3 wherein any feature polygon that is self-occluding in any view of any of the light fields is automatically broken into smaller non-self-occluding feature polygons.

8. The system of claim 1 wherein specifying corresponding feature elements in at least one view of both the source and target light fields comprises
   specifying at least one corresponding feature polygon in the at least one view of both the source and target light fields; and
   specifying at least one of feature lines and background edges in the at least one view of both the source and target light fields.

9. The system of claim 1 wherein warping the source and target light fields to align the feature elements comprises:

computing a global visibility map for each of the source and target light fields based on the specified corresponding feature elements in the at least one view of both the source and target light fields;

forming at least one ray bundle for each light field for each specified corresponding feature element in the at least one view of both the source and target light fields;

performing ray-space warping of the ray bundles associated with each of the source and target light fields to align the feature elements of those light fields and fill holes in the warped light fields.

10. The system of claim 9 wherein each global visibility map is computed using OpenGL.

11. The system of claim 9 wherein each global visibility map is computed by a two-pass OpenGL computation using an OpenGL stencil buffer.

12. The system of claim 1 wherein blending the warped light fields comprises compositing the warped light fields by performing any of interpolating between the warped light fields, feathering the warped light fields, and deghosting the warped light fields.

13. A computer-implemented process for automatically morphing a light field representing a 3D object, comprising:
inputting a first and second light field representing a first and second 3D object, respectively;
specifying corresponding feature polygons in at least one view of each light field;
computing a visibility map of each light field based on the specified corresponding feature polygons;
computing ray bundles corresponding to each feature polygon based on the visibility map of each light field;
performing ray-space warping of the ray bundles to align the feature polygons for each light field to produce warped versions of the first and second light fields; and
blending the warped light fields to produce a composite light field representing a morphed light field.

14. The computer-implemented process of claim 13 further comprising rendering the morphed light field to produce at least one 3D view of a morphed object represented by the morphed light field.

15. The computer-implemented process of claim 13 wherein specifying corresponding feature polygons in at least one view of each light field comprises:
specifying at least one feature point in the first light field;
specifying a corresponding feature point in the second light field for each feature point specified in the source light field;
defining at least one feature polygon in the first light field by selecting three or more of the specified feature points around the circumference of each feature polygon; and
defining at least one corresponding feature polygon in the second light field by selecting three or more of the specified corresponding feature points around the circumference of each corresponding feature polygon.

16. The computer-implemented process of claim 15 wherein specifying the corresponding feature point in the second light field comprises specifying a point along an epipolar line automatically drawn on the second light field for each feature point specified in the first light field.

17. The computer-implemented process of claim 13 further comprising specifying corresponding feature lines in at least one view of each light field.

18. The computer-implemented process of claim 13 further comprising specifying corresponding background edges in at least one view of each light field.

19. The computer-implemented process of claim 13 wherein any feature polygon that is self-occluding in any view of any of the any fields is automatically broken into smaller non-self-occluding feature polygons.

20. The computer-implemented process of claim 13 wherein computing a visibility map of each light field comprises computing a visibility of each feature polygon for each view of each light field.

21. The computer-implemented process of claim 20 wherein the visibility of each feature polygon is computed using OpenGL.

22. The computer-implemented process of claim 20 wherein the visibility of each feature polygon is computed using a two-pass OpenGL computation using an OpenGL stencil buffer.

23. The computer-implemented process of claim 13 wherein computing ray bundles corresponding to each feature polygon based on the visibility map of each light field comprises bundling all rays from each view of each light field that correspond to a single feature polygon visible to each ray.

24. The computer-implemented process of claim 13 wherein performing ray-space warping of the ray bundles further comprises filling holes resulting from occlusion caused by object shape change as a result of the warping.

25. The computer-implemented process of claim 24 wherein the holes are filled using at least one nearest visible ray.

26. The computer-implemented process of claim 13 wherein blending the warped light fields to produce the composite light field comprises compositing the warped light fields by performing linear interpolation between the warped light fields.

27. The computer-implemented process of claim 13 further comprising deghosting the blended warped light fields.

28. The computer-implemented process of claim 13 further comprising feathering the blended warped light fields.

29. A computer-readable medium having computer executable instructions for automatically morphing 3D objects, comprising:
computing a first light field for a first 3D object;
computing a second light field for a second 3D object;
specifying at least one corresponding feature polygon for each of at least one view of the first and second light fields;
warping each of the first and second light fields to produce feature polygon alignment between each of the first and second light fields;
blending each of the warped first and second light fields to produce a composite light field; and
rendering the composite light field to produce a morphed 3D object having features of both the first and second 3D objects.

30. The computer-readable medium of claim 29 wherein at least one of the first and second 3D objects is a 3D model.

31. The computer-readable medium of claim 29 wherein warping each of the first and second light fields further comprises:
computing a visibility map of each light field based on the specified corresponding feature polygons;
computing ray bundles corresponding to each feature polygon based on the visibility map of each light field; and
performing ray-space warping of the ray bundles to align the feature polygons for each light field to produce warped versions of the first and second light fields.

32. The computer-readable medium of claim 29 wherein rendering the composite light field to produce morphed 3D object comprises using OpenGL rendering to produce a visible representation of the morphed 3D object.

33. The computer-readable medium of claim 29 wherein specifying at least one corresponding feature polygon for each of at least one view of the first and second light fields includes automatically providing epipolar recommendation lines for corresponding vertices of each feature polygon.

34. A computer-readable medium having computer executable instructions for automatically transferring 3D textures between 3D objects, comprising:

inputting a source light field representing a first 3D object;

providing a target light field representing a second 3D object;

specifying corresponding feature polygons in at least one view of each light field;

warping the source light field to align the source light field with the target light field;

determining ray correspondence between the warped source light field and the target light field;

assigning rays of the warped source light field to corresponding rays of the target light field;

rendering the target light field using the rays assigned from the source light field to produce a composite 3D object having a shape and structure of the target 3D object and a 3D texture of the source 3D object.

\* \* \* \* \*